United States Patent
Irwin, Jr. et al.

(10) Patent No.: US 9,430,789 B2
(45) Date of Patent: Aug. 30, 2016

(54) METHOD FOR VERIFYING THE AGE OR LOCATION OF A PLAYER BEFORE INITIATING PLAY OF AN INTERNET-BASED GAME

(71) Applicant: Scientific Games International, Inc., Newark, DE (US)

(72) Inventors: Kenneth Earl Irwin, Jr., Dawsonville, GA (US); Charles Kline, Camp Hill, PA (US); Gary Streeter, Andover, MA (US)

(73) Assignee: Scientific Games International, Inc., Newark, DE (US)

( * ) Notice: Subject to any disclaimer, the term of this patent is extended or adjusted under 35 U.S.C. 154(b) by 0 days.

(21) Appl. No.: 14/480,723

(22) Filed: Sep. 9, 2014

(65) Prior Publication Data
US 2015/0066694 A1 Mar. 5, 2015

Related U.S. Application Data

(60) Division of application No. 13/853,157, filed on Mar. 29, 2013, now Pat. No. 8,827,795, which is a continuation of application No. 12/898,821, filed on Oct. 6, 2010, now Pat. No. 8,408,986.

(60) Provisional application No. 61/280,330, filed on Nov. 2, 2009, provisional application No. 61/340,807, filed on Mar. 23, 2010.

(51) Int. Cl.
*G07F 17/32* (2006.01)
*G06Q 30/06* (2012.01)

(52) U.S. Cl.
CPC .......... *G06Q 30/0607* (2013.01); *G07F 17/32* (2013.01); *G07F 17/329* (2013.01); *G07F 17/3241* (2013.01)

(58) Field of Classification Search
USPC .......................................................... 463/17
See application file for complete search history.

(56) References Cited

U.S. PATENT DOCUMENTS

| | | |
|---|---|---|
| 4,882,473 A | 11/1989 | Bergeron et al. |
| 5,327,485 A | 7/1994 | Leaden |

(Continued)

FOREIGN PATENT DOCUMENTS

WO   WO 2004/082781   9/2004

OTHER PUBLICATIONS

PCT Search Report, Feb. 4, 2011.

*Primary Examiner* — Jason Skaarup
(74) *Attorney, Agent, or Firm* — Dority & Manning, P.A.

(57) ABSTRACT

A method for verifying the age or location of a player of an Internet-based lottery game entails providing lottery tickets for purchase by players at an authorized retail location, the lottery tickets having a game authorization code that is entered by the initiate play of the Internet-based lottery game on an internet enabled device. The age of the player is verified at the retail location and a separate verification password is entered via a terminal that is in communication with to the lottery system central computer, with the password linked to the game authorization code. Upon initiating play of the game via a web site, the player enters the verification password separately from the game authorization code. An Internet game server communicates with the lottery system central computer to ensure that the entered verification password corresponds to the linked verification password prior to permitting play of the Internet-based lottery game.

11 Claims, 16 Drawing Sheets

(56) References Cited

U.S. PATENT DOCUMENTS

| | | | | |
|---|---|---|---|---|
| 5,365,575 A | * | 11/1994 | Katz | 379/93.13 |
| 5,398,932 A | | 3/1995 | Eberhardt et al. | |
| 5,471,039 A | | 11/1995 | Irwin et al. | |
| 5,709,603 A | * | 1/1998 | Kaye | 463/17 |
| 5,791,990 A | | 8/1998 | Schroeder et al. | |
| 5,935,000 A | | 8/1999 | Sanchez, III et al. | |
| 5,996,997 A | | 12/1999 | Kamille | |
| 5,997,044 A | | 12/1999 | Behm et al. | |
| 6,024,641 A | | 2/2000 | Sarno | |
| 6,146,272 A | | 11/2000 | Walker et al. | |
| 6,154,172 A | | 11/2000 | Piccionelli et al. | |
| 6,178,510 B1 | | 1/2001 | O'Connor et al. | |
| 6,277,026 B1 | | 8/2001 | Archer | |
| 6,322,446 B1 | | 11/2001 | Yacenda | |
| 6,379,742 B1 | | 4/2002 | Behm et al. | |
| 6,383,078 B1 | | 5/2002 | Yacenda | |
| 6,435,408 B1 | | 8/2002 | Irwin et al. | |
| 6,491,215 B1 | | 12/2002 | Irwin et al. | |
| 6,776,337 B2 | | 8/2004 | Irwin et al. | |
| 6,846,238 B2 | | 1/2005 | Wells | |
| 6,869,358 B2 | | 3/2005 | Yacenda | |
| 6,875,105 B1 | | 4/2005 | Behm et al. | |
| 7,008,317 B2 | | 3/2006 | Cote et al. | |
| 7,035,626 B1 | * | 4/2006 | Luciano, Jr. | 455/414.1 |
| 7,155,014 B1 | | 12/2006 | Hamman et al. | |
| 7,460,863 B2 | | 12/2008 | Steelberg et al. | |
| 7,510,474 B2 | | 3/2009 | Carter, Sr. | |
| 7,815,502 B2 | | 10/2010 | Hardy et al. | |
| 7,819,747 B2 | | 10/2010 | Kane et al. | |
| 7,959,502 B2 | | 6/2011 | Kane et al. | |
| 7,988,550 B2 | | 8/2011 | White | |
| 7,988,551 B2 | | 8/2011 | Walker et al. | |
| 8,033,905 B2 | | 10/2011 | Irwin et al. | |
| 8,047,917 B2 | | 11/2011 | Kane et al. | |
| 8,109,828 B2 | | 2/2012 | Kane et al. | |
| 8,192,269 B2 | | 6/2012 | Yacenda | |
| 8,241,100 B2 | | 8/2012 | Katz et al. | |
| 8,275,358 B1 | | 9/2012 | Adelson | |
| 8,348,742 B2 | * | 1/2013 | Yacenda | G07F 17/32 463/17 |
| 2002/0090986 A1 | * | 7/2002 | Cote et al. | 463/16 |
| 2003/0050109 A1 | | 3/2003 | Caro et al. | |
| 2004/0049463 A1 | | 3/2004 | Kwon | |
| 2004/0111369 A1 | * | 6/2004 | Lane et al. | 705/40 |
| 2004/0123242 A1 | | 6/2004 | McKibben et al. | |
| 2004/0204215 A1 | | 10/2004 | Meehan et al. | |
| 2004/0259626 A1 | * | 12/2004 | Akram et al. | 463/17 |
| 2004/0259631 A1 | | 12/2004 | Katz et al. | |
| 2005/0176500 A1 | * | 8/2005 | Mathews et al. | 463/29 |
| 2005/0181870 A1 | | 8/2005 | Nguyen et al. | |
| 2005/0233797 A1 | | 10/2005 | Gilmore et al. | |
| 2005/0239534 A1 | | 10/2005 | Carstens et al. | |
| 2005/0262338 A1 | | 11/2005 | Irwin, Jr. | |
| 2006/0035695 A1 | | 2/2006 | Carstens et al. | |
| 2006/0035697 A1 | | 2/2006 | Packes et al. | |
| 2006/0172799 A1 | * | 8/2006 | Kane et al. | 463/25 |
| 2006/0178187 A1 | | 8/2006 | Walker et al. | |
| 2006/0211470 A1 | | 9/2006 | Walker et al. | |
| 2006/0247000 A1 | | 11/2006 | Schneier et al. | |
| 2006/0287051 A1 | | 12/2006 | Katz et al. | |
| 2007/0054739 A1 | | 3/2007 | Amaitis et al. | |
| 2007/0060284 A1 | | 3/2007 | Yacenda | |
| 2007/0105612 A1 | | 5/2007 | Fotevski | |
| 2007/0113280 A1 | | 5/2007 | Irwin, Jr. | |
| 2007/0129144 A1 | | 6/2007 | Katz et al. | |
| 2007/0202941 A1 | * | 8/2007 | Miltenberger et al. | 463/25 |
| 2008/0058057 A1 | | 3/2008 | Lau et al. | |
| 2008/0194311 A1 | * | 8/2008 | Cage et al. | 463/17 |
| 2008/0274796 A1 | | 11/2008 | Lube | |
| 2009/0023490 A1 | | 1/2009 | Moshal et al. | |
| 2009/0037311 A1 | | 2/2009 | Omar | |
| 2009/0137304 A1 | * | 5/2009 | Yacenda | 463/17 |
| 2009/0176566 A1 | * | 7/2009 | Kelly | 463/29 |
| 2009/0203448 A1 | | 8/2009 | Lupo et al. | |
| 2009/0206156 A1 | | 8/2009 | Meehan | |
| 2009/0227320 A1 | | 9/2009 | McBride | |
| 2009/0236417 A1 | | 9/2009 | Meehan et al. | |
| 2009/0253481 A1 | | 10/2009 | Honour | |
| 2009/0280886 A1 | | 11/2009 | Randhawa | |
| 2010/0025491 A1 | | 2/2010 | Finocchio | |
| 2010/0062822 A1 | | 3/2010 | Frick et al. | |
| 2010/0093419 A1 | | 4/2010 | Wright et al. | |
| 2010/0113124 A1 | | 5/2010 | Amirsadri et al. | |
| 2010/0121719 A1 | | 5/2010 | Blair et al. | |
| 2010/0190541 A1 | | 7/2010 | Lazar | |
| 2010/0203943 A1 | * | 8/2010 | Hughes | 463/17 |
| 2013/0260878 A1 | * | 10/2013 | Saunders et al. | 463/29 |

* cited by examiner

METHOD FOR VERIFYING THE AGE OR LOCATION OF A PLAYER BEFORE INITIATING PLAY OF AN INTERNET-BASED GAME

PRIORITY CLAIM

The present application is a Continuation application of U.S. application Ser. No. 13/853,157, filed Mar. 29, 2013, which is a Continuation application of U.S. application Ser. No. 12/898,821, filed on Oct. 6, 2010, which claims priority to U.S. Provisional Application Serial Nos. 61/280,330 filed on Nov. 2, 2009, and 61/340,807 filed on Mar. 23, 2010.

FIELD OF THE INVENTION

The present application proposes a methodology and associated system for verifying the age and/or location of a player before the player can initiate play of an Internet-based lottery game.

BACKGROUND

Lottery games have become a time honored method of raising revenue for state and federal governments the world over. Traditional scratch-off and on-line games have evolved over decades and supply increasing revenue year after year. However, after decades of growth, the sales curves associated with traditional games seem to be flattening out. Consequently, both lotteries and their service providers (e.g., Scientific Games, GTech, Pollard Banknote, Intralot, etc.) are presently searching for new forms of gaming.

To date there has been much speculation about providing various lottery products to the consumer over the Internet. The benefits are obvious; greater accessibility and a richer gaming environment for the player will result in enhanced sales. However, there are various United States federal laws that bring into question the legality of such an enterprise. Specifically, laws that require proof that the Internet gaming experience took place within the jurisdiction of the lottery authority (e.g., a given state's boundaries) and require that the consumer of the lottery Internet product is of legal age. These are particularly challenging obstacles, given that a violation of either requirement (i.e., location or age authentication) could result in felony charges against the institution running the Internet lottery operation.

Additionally, any attempt at implementing a new legal (i.e., lottery based) Internet gaming product invariably involves developing new costly infrastructures for sales and redemption as well as the gaming environment itself. It is therefore highly desirable to develop a system for authenticating age and location for Internet gaming as well as ensuring that said system could be readily integrated into an existing lottery's infrastructure.

Partially because of these legal hurdles and auditing requirements, any proposed Internet lottery game to date has been of a deterministic nature—i.e., the outcome of the game is determined before it starts. While the Internet does offer the ability to enhance the deterministic gaming experience, the very nature of deterministic games limits the enhanced experience and ultimately causes the games to seem stale to experienced consumers. The lack of game-dynamic-player-input ultimately limits the Internet gaming experience. Thus, it is highly desirable to also develop an Internet gaming platform that not only conforms to legal requirements but also allows for dynamic play (e.g., a player is allowed to vary his bet and cash out at any time) resulting in a more fulfilling Internet gaming experience.

SUMMARY

Objects and advantages of the invention will be set forth in part in the following description, or may be obvious from the description, or may be learned through practice of the invention.

In accordance with aspects of the invention, a server implemented method is provided for verifying the age or location of a player of an Internet-based lottery game. The method includes providing lottery tickets for purchase by a player at an authorized retail location, with the lottery tickets having a game authorization code that the player enters via an Internet enabled device to initiate play of the Internet-based lottery game on an internet enabled device. The retail location includes a terminal in communication with a lottery system central computer that is in further communication with an Internet game server for implementing the Internet-based lottery game via a web site. The player's age is verified at the retail location and, for verified players, a separate verification password is entered via the terminal to the lottery system central computer, with the verification password being linked to the game authorization code. The verification password is provided to the player, wherein upon the player initiating play of the game via the web site, he is required to enter the verification password separately from the game authorization code. The Internet game server communicates with the lottery system central computer to ensure that the entered verification password corresponds to the linked verification password prior to permitting the player to proceed with play of the Internet-based lottery game.

The verification password may be a personal identification number (PIN) entered by the player at the terminal, which is only known to the player, or any other suitable code, indicia, and the like.

The present invention also encompasses a method for verifying the geographical location of a player's internet enabled device (IDE) prior to play of an Internet-based lottery game on the IDE, wherein the IDE is equipped with wireless location data transmission capability, such as any manner of known radio frequency (RF) location system (e.g., GPS, Wi-Fi positioning system, cellular phone receiver, and so forth). Upon the player initiating play of an Internet-based lottery game with an IDE via a web site maintained by an Internet game server in communication with a lottery system central computer, a geographic location of the IDE is determined with the location data transmission capability. Via the IDE (e.g, display screen query, text message, etc.) permission is sought from the player to transmit the determined geographic location to the Internet game server. If the player denies permission, they are then provided with an option to transmit a location verification code (LVC) from the IDE to the Internet game server. The LVC is a code generated by the IDE that simply confirms location of the IDE within a given a given geographic area (e.g., the lottery's jurisdictional area) without providing actual position of the IDE within the geographic area.

In certain embodiments, the lottery authority provides the software (e.g., downloads) to the IDE to enable generation of the LVC by the IDE.

The LVC may first be displayed to the player, wherein the player then inputs the LVC prior to commencement of the game.

In a particular embodiment, the IDE may include a Wi-Fi receiver, wherein location of the IDE is determined by an embedded software application as a function of known media access control (MAC) addresses of Wi-Fi access points accessed by the IDE. The software application may also generate the LVC in the event that the player refuses permission to transmit location of the IDE as determined by the Wi-Fi access points.

In other embodiments, the IDE is equipped with multiple wireless location data transmission capabilities, and the method includes establishing a hierarchy of the wireless location data transmission capabilities, wherein a second one of the location data transmission capabilities in the hierarchy is attempted only if a first one of the location data transmission capabilities is unable to determine location of the IDE or the player has refused permission to transmit the LVC associated with the first one of the location data transmission capabilities. The IDE may be, for example, a mobile cellular device and the player refuses permission to transmit the LVC associated with all of the device's wireless location data transmission capabilities. In this instance, the method may further include providing the player with a code via the IDE and a prompt instructing the player to place an initial call to a given telephone number via a land line telephone and enter the code. The location is determined for the land line telephone via a conventional caller ID system to verify that the player is within the given geographic area for play of the lottery game. This embodiment may also entail placing a call back to the caller ID number generated by the player's initial call, wherein the player is then prompted to enter the code before play of the lottery game can be initiated.

In still a further embodiment, upon verification that the IDE is within the given geographic area, a confirmation code is generated and transmitted to the player's IDE and stored at the lottery system central computer. The player is given the option to enter the code in a different gameplay IDE for actual play of the lottery game (e.g., a device with a larger screen or better graphics), wherein the entered confirmation code is then compared to the stored confirmation code prior to access being granted to play the lottery game via the gameplay IDE.

DETAILED DESCRIPTION

Reference will now be made in detail to embodiments of the invention, one or more examples of which are illustrated in the figures. Each example is provided by way of explanation of the invention, and not meant as a limitation of the invention. For example, features illustrated or described as part of one embodiment can be used with another embodiment to yield a third embodiment. It is intended that the present invention include these and other modifications and variations.

Figure 1:
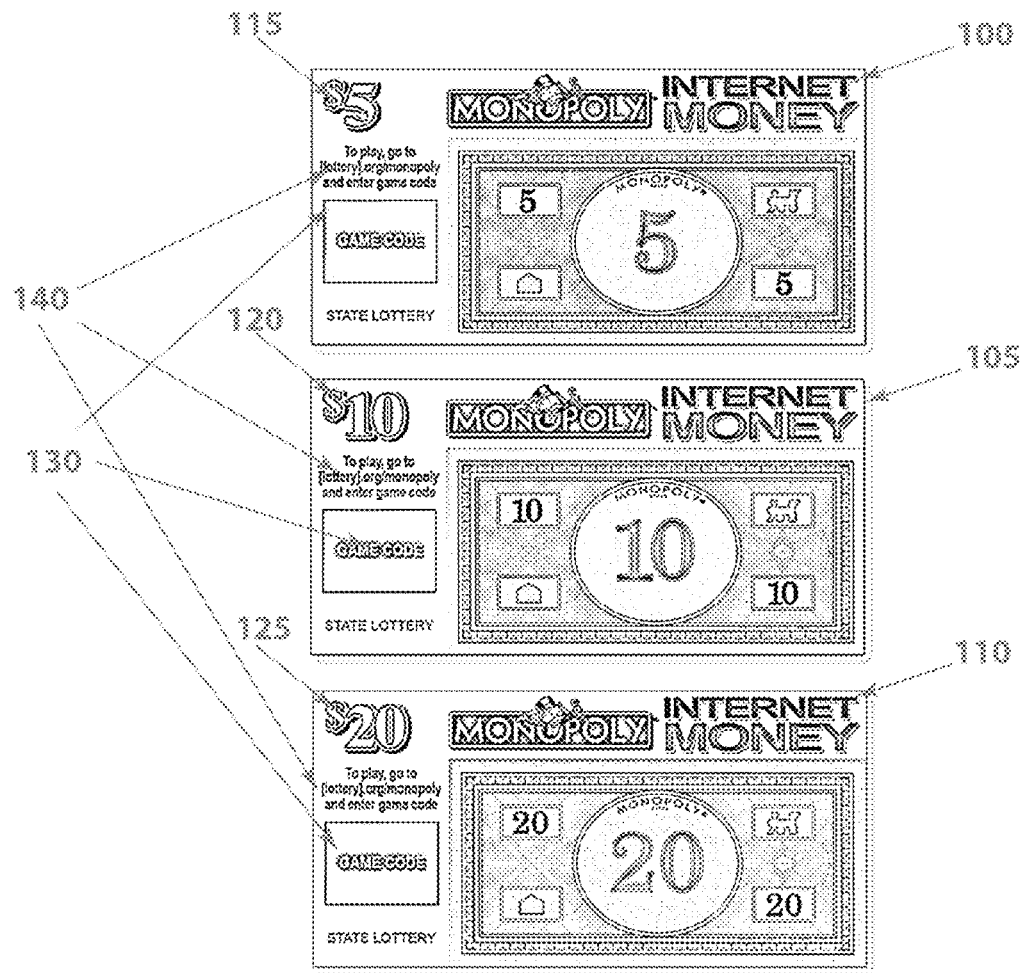
FIG. 1 is a front plan view of a first representative example of a lottery-type instant ticket used to deposit funds for Internet gaming.
Figure 2:
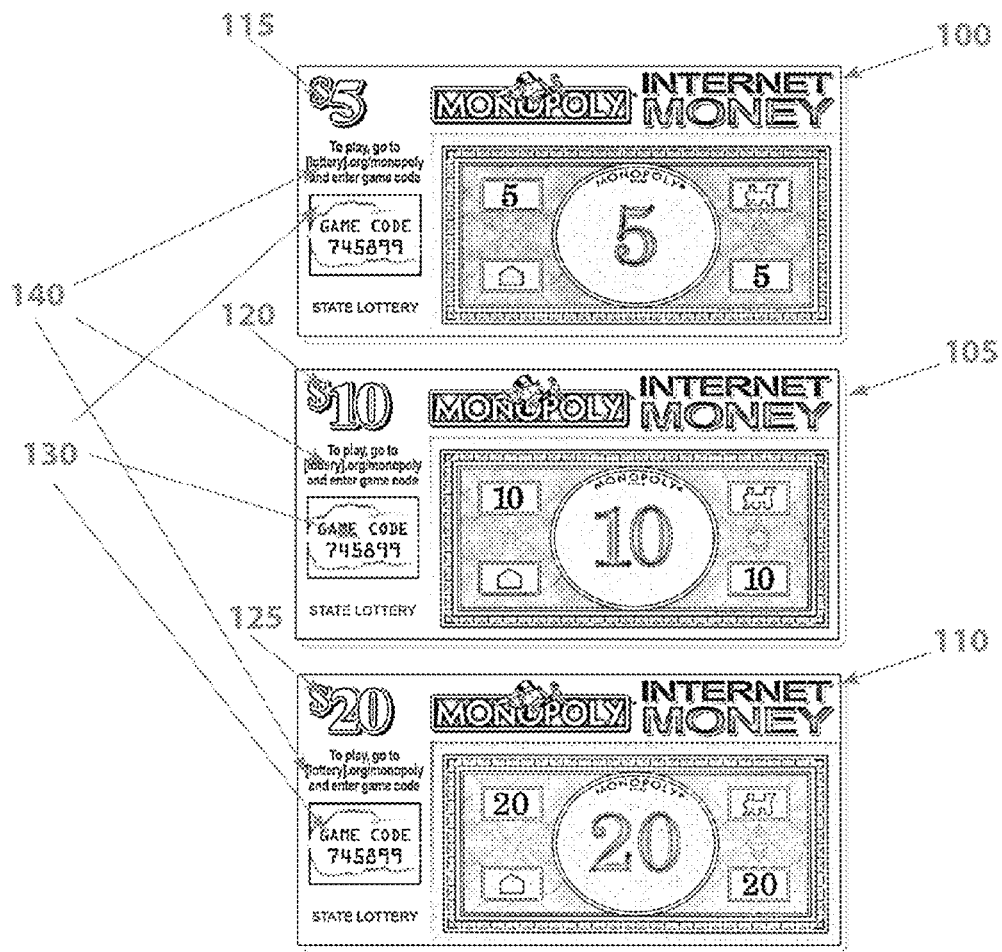
FIG. 2 is a front plan view of the first representative example of the lottery-type instant ticket used to deposit funds for Internet gaming of FIG. 1 showing the scratch off coatings removed.
Figure 4:
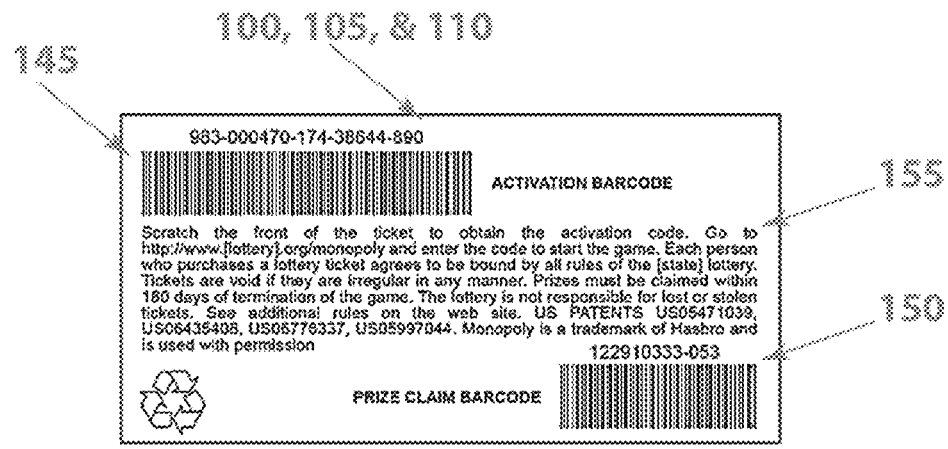
FIG. 4 is a view of the back of the lottery lottery-type instant ticket used to deposit funds for Internet gaming of FIGS. 1-2.

FIGS. 1 and 2 depict a first representative example of Internet tickets 100, 105, and 110 having two components: a prepaid money amount 115, 120, and 125 and a removable Scratch-Off-Coating (SOC) 130 lottery instant ticket portion obscuring GACs until the ticket(s) are purchased by a consumer. These instant lottery tickets 100, 105, and 110 are provided as one embodiment of a suitable lottery ticket, however it should be understood that other lottery-type tickets, for example, on-line tickets printed in real time, can be used and may be more desirable in some applications. In this example, the tickets 100, 105, and 110 resemble traditional instant-win tickets and can be purchased in the normal manner at a lottery retailer. After purchase, the consumer removes the Scratch-Off-Coating (SOC) 130 to reveal the, previously hidden, GAC indicia data 135—FIG. 2. The consumer then uses his computer, smart telephone, or other Internet Device (IDE) to visit the specified web site 140 (155 in the instructions on the back of the ticket as shown in FIG. 4) via Internet browser or special application and enter the GAO indicia data 135.

Figure 3:
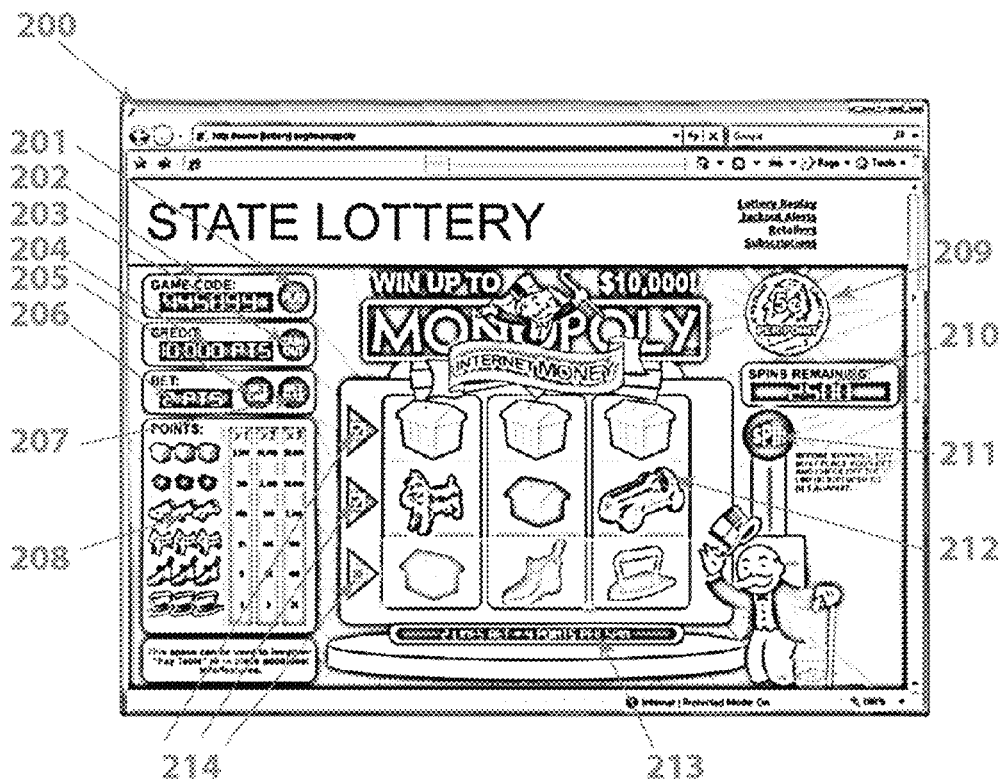
FIG. 3 is a front plan view of a lottery sponsored web page that allows for the Internet funds of FIG. 1 and FIG. 2 to be used to play a virtual slot-type machine on the Internet.

In this embodiment, the web site would validate the submitted GAO and determine the location of the IDE and, assuming the device is within the lottery's jurisdiction, would enable an Internet game in which the outcome of the game is determined by an on-line pseudorandom generator and not by the GAO indicia data 135. As shown in FIG. 3 one possible example of an on-line pseudorandom generator game, is an Internet slot-machine type game (web page 200) wherein the consumer enters the GAO indicia data 135 by typing or other means into a GAME CODE entry window 202. After the code has been correctly entered, the information would be sent to the lottery by clicking or otherwise actuating the PLAY virtual button 201. After receiving the GAO, the lottery computer would, by various methods, validate the code and determine the location of the consumer's IDE and, if several criteria are met, the total number of CREDITS would appear in a display 204. The total number of CREDITS 204 being derived from the price (e.g., 115, 120, or 125) of the ticket purchased divided by the cost per point (e.g., 5¢ as shown in 209). The consumer would now be allowed to start playing the game.

The CASH OUT virtual button 203 is present because this example reflects an embodiment of an Internet game wherein the outcome is determined by an on-line pseudo-random generator as the consumer plays the game and not predetermined by the ticket code 135. Thus, the consumer has the option to actuate the CASH OUT virtual button 203 at any time, with the number of credits present 204 when the consumer actuates the CASH OUT virtual button 203 reflecting the amount of money he has won.

To play the game, in this example, the consumer would select the desired points per BET 206 via the BET ONE 205 or BET MAX 207 virtual buttons. The BET MAX 207 virtual button differs from the BET ONE 205 in that actuating the BET MAX 207 virtual button typically will bet the maximum number of points and the maximum number of lines (consistent with the remaining Credits 204) and spin the reels. If the consumer chooses the BET ONE button, he can select the desired points per bet in increments of one for each depression of the button. He would then select the number of lines on the virtual slot-type machine 212 he would like to play per spin by actuating one or more of the virtual line check marks 214. As shown in FIG. 3 the user interface could highlight the selected line(s) 214 on the virtual slot-type machine (e.g., by adding a background color to the entire line) to provide additional visual feedback to the consumer that multiple lines have (or have not) been selected by the virtual row check marks 214. Additional visual feedback 213 can also be provided by explicitly displaying the total number of lines selected resulting in the total amount wagered per spin (4 points per spin in this example 213). In addition to the previously discussed visual feedback indicators, a SPINS REMAINING 210 counter could be available, providing an indication of how many spins (plays) remain based upon the total number of CREDITS 204 and the POINTS PER SPIN 213 currently selected. Once the correct wager is programmed, the consumer would actuate the virtual SPIN "lever" 211. The virtual slot-machine 212 would spin its virtual reels and eventually stop with winning or losing patterns displayed as identified by a prize table display 208. The consumer could continue to play the Internet game until he elects to CASH OUT 203 or no longer has any CREDIT showing in the display 204.

Assuming CREDITS 204 remain and the consumer actuates the CASH OUT virtual button 203, there are numerous methodologies available for the consumer to receive his winnings from the lottery. For example, the consumer could request a check, or direct deposit to a specified account, or debit card account, or request a CREDIT transfer to another game directly through the Internet interface 200. Alternatively, the Internet interface 200 could allow the consumer to print a ticket on a local printer that would include a unique redemption code identifiable by any of the lottery's terminals available throughout its jurisdiction. Another alternative would be for the standard lottery-type instant ticket inventory number 145 (FIG. 4) to be used as the code to allow redemption at a lottery retailer. However, this example has the disadvantage that existing lottery redemption systems, for security reasons, are designed to greatly restrict or forbid any changes in the instant ticket database after the tickets are placed on sale—especially prize values. A better alternative for the embodiment of the game being discussed (i.e., the outcome is determined by an on-line pseudorandom generator as the consumer plays the game) is to add a second PRIZE CLAIM code 150 to the lottery-type instant ticket in addition to the standard inventory number 145. This PRIZE CLAIM code 150 could be embodied as a barcode and human readable code as shown in FIG. 4 and as is obvious to anyone skilled in the art, the PRIZE CLAIM code 150 could be embodied by other means (e.g., magnetic stripe, OCR, star code, etc).

The unique PRIZE CLAIM code 150 has the advantage of being readily adaptable to existing lottery redemption systems. For example, in one possible embodiment the unique PRIZE CLAIM code 150 could emulate the structure of the lottery's existing on-line ticket (e.g., Power Ball, Pick 3, Pick 4, etc.) data structure. Since on-line tickets typically are issued in real-time as a wager is made at a lottery terminal, their associated unique serial number data structure functions only to reference the wager for a future drawing. When the future drawing occurs, all of the previous wagers stored in the on-line database are scanned to determine the winners. After the post-drawing scan is completed, winning on-line ticket serial numbers are automatically credited with the correct winning amounts. Thus, by emulating the structure of the lottery's existing on-line ticket data structure in an Internet ticket unique PRIZE CLAIM code 150, the Internet tickets 100, 105, and 110 could be readily sold without allowing any redemption until the game is played on the Internet. The existing lottery on-line system would readily accommodate this scenario by initially logging all PRIZE CLAIM codes 150 on all tickets for a future drawing. When the consumer actuates the CASH OUT virtual button 203 and any CREDITS 204 remain, the system will automatically calculate the cash equivalent and log the credit to the associated PRIZE CLAIM code 150 in a drawing winners' file. Periodically, say once every twenty-four hours, the drawing winner file would be transferred from the web servers and loaded onto the lottery's existing validation system. Once loaded, the lottery validation system would then automatically instruct a retailer to pay the consumer the amount credited when he actuated the CASH OUT virtual button 203. To assist in database management, the PRIZE CLAIM code 150 can be algorithmically linked to the GAC indicia data 135 (e.g., keyed hash, indicia data 135 is a cipher text version of PRIZE CLAIM code 150, etc.) so long as the, hidden until purchased, indicia data 135 cannot be deduced from the, readily displayed, PRIZE CLAIM code 150. Alternatively, the PRIZE CLAIM code 150 and indicia data 135 could be two algorithmically unrelated blocks of data only linked by a secure database. Obviously, in this embodiment where the PRIZE CLAIM code 150 is linked to a drawing, there would be some notice given to the consumer that "Winning tickets can be redeemed twenty-four hours after cashing out" or words to the same effect.

Figure 5:
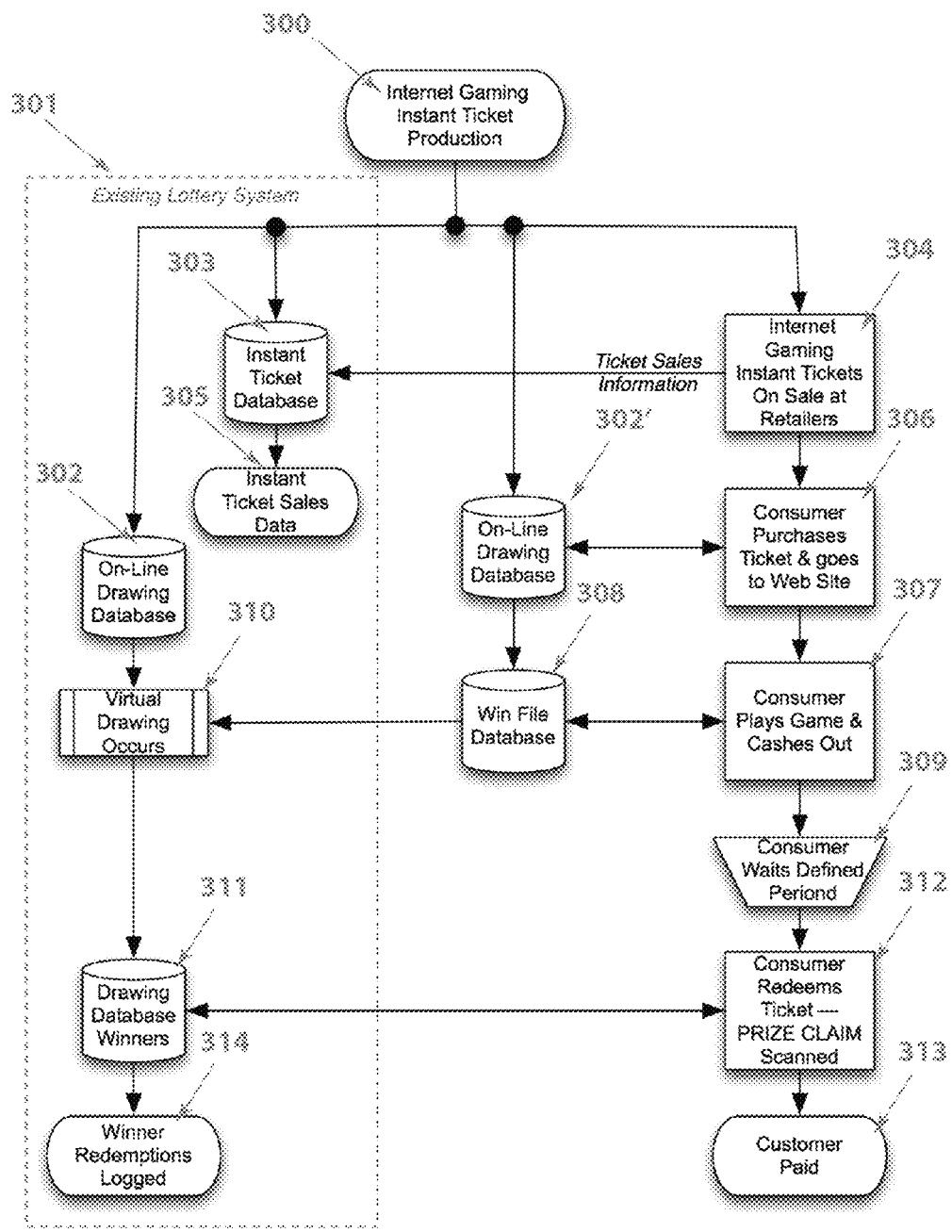
FIG. 5 is a flow chart illustrating a first method of producing, distributing, and selling lottery-type instant ticket used to deposit funds for Internet gaming of FIGS. 1-2 and 4.

FIG. 5 illustrates a first method of producing and selling the Internet tickets of the type 100, 105, 110 and associated Internet game 200. In this case it is contemplated that the Internet tickets would be distributed within an existing distribution network already in place for instant lottery games and the tickets could be redeemed with the existing system (301 in FIG. 5). However, in this case, since the outcome of the Internet game 200 is not predetermined, there can remain the added tasks of transferring winning amounts to the drawing winner database when the consumer actuates the CASH OUT virtual button 203 with CREDITS 204 remaining.

Beginning at block 300 on the flowchart illustrated in FIG. 5, the institution responsible for printing a lottery's instant tickets produces a run of Internet tickets of the type 100, 105, 110 to fund the Internet game 200. As is normal in this type of production process, the produced instant tickets are delivered to the lottery and placed on sale at the lottery's retailers 304. As is also routine in instant ticket production, a digital file representing the shipping and validation information for the entire instant ticket run is delivered to the lottery's central site system 303. Under normal operations this file would be used for both inventory control as well as validation, however in this embodiment the tickets of the type 100, 105, 110 simply fund an Internet game 200 and therefore the winning or losing status of a given ticket is not known at the time of production or sale. Therefore, the instant ticket database will be utilized in this embodiment primarily for logistical control and accumulating sales data 305.

As shown in the flowchart illustrated in FIG. 5, there is one more deliverable 302 from the instant ticket printer, in this embodiment, that is normally not required for instant tickets. This On-Line Drawing Database 302 contains all of the PRIZE CLAIM codes 150 from all of the tickets of the type 100, 105, 110 produced. In theory, the delivery of this on-line database 302 to the lottery's existing central site system 301 is optional, since all of the on-line serial numbers delivered will be for a virtual drawing at a future date with no immediate value. However, most lottery redemption systems require that a file exists for all sold on-line drawing serial numbers before a drawing can occur. This being the case, the delivered on-line database file 302 would function as the sold on-line drawing tickets, even though the instant tickets of the type 100, 105, 110 are put on sale (i.e., not yet sold) at the time the file 302 is delivered.

A related or identical copy of the same on-line database is also delivered 302' to the web server running the Internet game 200. This copy of the database is used by the server to: determine the authenticity of received GAO indicia data 135, ensure that no GAO indicia data 135 is credited twice, and to generate the correct PRIZE CLAIM codes 150 for the tickets associated with winning games (i.e., where the consumer actuates the CASH OUT virtual button 203 with CREDITS 204 remaining) in the Win File database 308. It should be noted, that the related or identical copy of the on-line database 302' could be simply replaced with the on-line database 302 resident at the lottery's central site 301 with all Internet gaming transactions being conducted by the lottery's central site system. Indeed, in new applications this embodiment may be more desirable, however for adding Internet gaming to existing lottery central site systems 301 that were not originally designed to accommodate this type of interface, it may be desirable to implement the Internet functionality on separate servers for ease of integration. Obviously, these separate servers could be physically located at the same location as the existing lottery central site system 301.

Next in this example, the consumer purchases a ticket 306 and visits the specified Internet gaming site 200 via web browser, specific application, or other means. When the consumer enters the GAO indicia data 135 by typing or other means into a GAME CODE entry window 202 and actuates the PLAY button 201, the entered data is transferred to the server containing the on-line database 302' where it is both authenticated and checked to ensure that the same GAO indicia data 135 has not been used before. If the GAO indicia data 135 is incorrect or has been used before the appropriate error message will be returned to the consumer and game play will not be allowed. However, if the GAO indicia data 135 is authentic and unused, the lottery server will then attempt to validate that the consumer is physically located within the lottery's jurisdiction at a block 306'. Assuming the consumer's location is confirmed, he will be allowed to play the Internet game 200 until he exhausts all credits or actuates the CASH OUT virtual button 203 with CREDITS 204 remaining 307. In the latter case, the number of credits remaining will be transformed into a cash equivalent and logged with the consumer's ticket's PRIZE CLAIM code 150 on the Win File database 308. After completing the game, the consumer will receive a notice indicating when (if not immediately) he can cash his ticket at a lottery retailer.

Virtual drawings will be periodically conducted 310 at the lottery central site 301 for the Internet game 200. The time period for the virtual drawing is flexible and could be every twenty-four hours, or even as often as every minute. The purpose of the virtual drawing is to load the winning tickets PRIZE CLAIM codes 150 onto the lottery's central site system 301 so that the existing infrastructure of retailers can cash tickets that became winners after Internet game play. By conducting a virtual drawing for these winning tickets as they are created, the existing lottery central site system 301, on-line drawing software accepts the newly generated winners without significant modification and generates the appropriate Drawing Database of Winners 311. Winning PRIZE CLAIM codes 150 from previous drawings can simply be rolled over into the latest Drawing Database of Winners 311 with the old file being deleted or modified depending on the nuances of the lottery's central site software system 301.

As soon as the consumer has waited the predefined time period (if any) 309 he can cash his ticket (assuming it was determined to be a winner by Internet game play). To cash his ticket, the consumer simply goes to any lottery retailer who then scans the ticket's PRIZE CLAIM code 150 on their lottery terminal 312. The authorization to pay the consumer would then be given in a similar manner to any on-line (i.e., drawing) winning ticket (311 and 312) with the winning ticket being logged at the central site as paid 314 and the consumer receiving payment 313.

Figure 6:
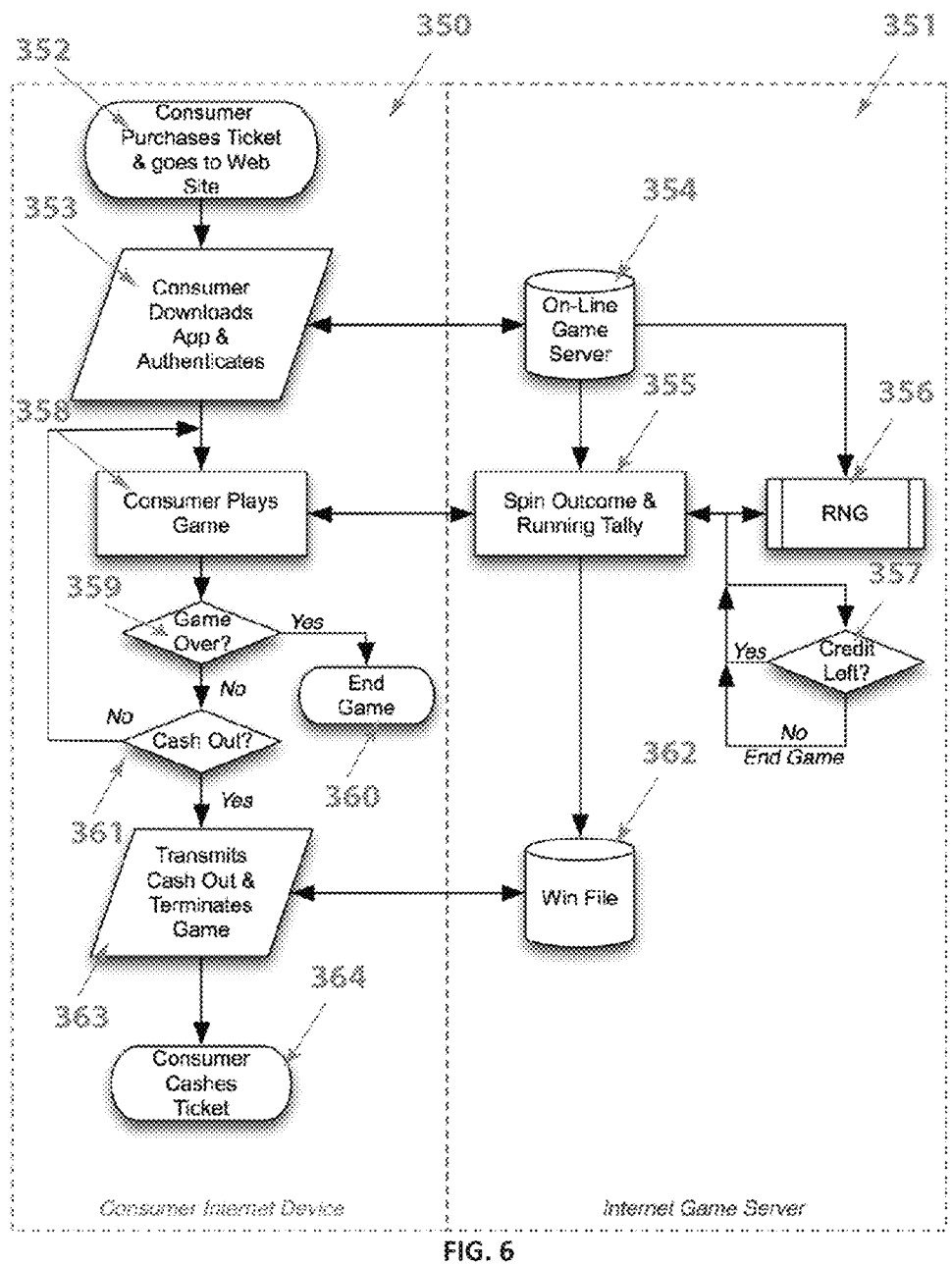
FIG. 6 is a flow chart illustrating details of the operation of the server portion for Internet gaming of FIG. 5.

The previously described system can be completely integrated into the existing lottery's system 301 or set-up with different components for the Internet gaming portion. In the latter case, the Internet portion can even be operated by a different entity than the lottery's central site 301. This separation of functionality has the potential to both reduce liability and enhance security. In either case, it is essential that particular attention to the security of the Internet game portion 200 be applied since the game's outcome is not predetermined. As illustrated in FIG. 6, all of the Internet game 200 logical components associated with the outcome of the game (other than the decision when to CASH OUT 361) are located on the Internet Game Server 351 and not the consumer's IDE 350. This separation is essential because various web browser applications (e.g., Java) can be easily decompiled at the consumer's device and are susceptible to various forms of Spoofing attacks. Even if the consumer's interface is supplied by a custom application (e.g., iPhone app), the fact that it runs on a platform outside of the control of the lottery makes it susceptible to fraudulent attacks. It is therefore, undesirable to log accounting information and decide if a particular play (spin) is a winner on the Consumer IDE 350.

In the method of FIG. 6, the overall system functionality and distribution is a subset to the embodiment of FIG. 5. Thus, this embodiment can generally be the same as the previous embodiment, providing more detail on the interaction between the Consumer's IDE 350 and the Internet Game Server 351. These details start on FIG. 6 with block 352 where the consumer purchases a ticket and goes to the associated web site. The first time the Consumer IDE 350 visits the web site operated by the Internet Game Servers 351, the IDE may need to download 353 a specific application compiled for his device or a web based (e.g., Java) application that runs on a hardware independent platform. Once the required application is downloaded, the consumer would be prompted to enter the GAC indicia data 135 by typing or other means into a GAME CODE entry window 202, which was created by the downloaded application, and then passed by the application to the On-Line Game Server 354. Assuming the GAC indicia data 135 is correct and has not been used before and the consumer's location is verified to be within the lottery's jurisdiction, the On-Line Game Server 354 will provide the Consumer's IDE 350 application with the correct amount of credits to display (based on the GAC indicia data 135) and will authorize it to proceed with play of the Internet game 200 by passing an unique Session IDentification (SID) code back to the application 353. This same SID code and total credits available are also passed to the logic that calculates a play's (spin's) outcome 355 resident on the Internet Game Server 351.

At this point, the consumer makes a wager and executes a play (spin) 358 on the Internet game 200. The details of this wager are then transmitted to the Spin Outcome & Running Tally module 355. Module 355 then calculates the outcome for the first play (spin) that has not yet occurred on the Consumer Game application 358. The module 355 calculates the outcome for the first play by using a seed from a pseudo-Random Number Generator (RNG) 356. Depending on the outcome of the play, the Spin Outcome & Running Tally module 355 will either credit or debit the running credit total for the consumer's game based on the wager that he made and determine if enough credits remain for another play 357. The outcome of the play is then passed from the Spin Outcome & Running Tally module 355 to the Consumer Game application 358 along with the credits remaining after the play. When the Consumer Game application 358 receives this information it will animate play (e.g., spin the reels 212 on the Internet game 200 display) with the play concluding as instructed by the Spin Outcome & Running Tally module 355 with the CREDIT window 204 incrementing or decrementing depending on the play's (spin's) outcome. If no credits remain 359, the Consumer Game application 358 will end the game 360. Otherwise, the application 358/359 will allow the consumer to either make another wager and play or to CASH OUT 203 and end the game with winnings 361. If the consumer elects to CASH OUT 203, the application will transmit this decision to the game server 351 and the monetary equivalent of credits will be added to the associated consumer's ticket's PRIZE CLAIM code 150 on the Win File 362 at the server. As previously mentioned, in this embodiment, the information from the Win File 362 will eventually be transferred to the lottery's central site system 301 so that the ticket can be redeemed at any retailer location by the consumer 364.

There are many possible ways of configuring the Spin Outcome & Running Tally module 355 and RNG module 356 of FIG. 6. One possibility is for each play (spin) the Outcome module 355 simply queries the RNG module 356 for the latest output. For any of these applications, the RNG 356 should be either a True hardware Random Number Generator (TRNG) or a software pseudo-RNG like a Linear Congruential Generator (LCG) or preferably a Mersenne Twister that receives a starting seed from real world data (e.g., a hash of the time the On-Line Game Server 354 was first contacted combined with the GAC indicia data 135 received when contacted). However, if a TRNG is selected, care should be taken to provide cryptographic authentication that the seed received from an external TRNG truly was created by that device. It is arguable, that the software RNG is preferable for this application if its input seeds are determined by an auditable sequence of events (e.g., hash chain of previous seeds coupled with a new seed). In either case, it may be desirable to utilize only one random seed per GAC indicia data 135 game, thereby enabling a better audit trail.

No matter what methodology is selected for the Spin Outcome & Running Tally module 355 and RNG module 356 of FIG. 6, it is essential that all credit bets, wins, and losses as well as all spin results be calculated and recorded on the Internet Game Server 351. These recorded transactions as well as the outcome of the RNG module 356 will constitute an audit trail that can be used to resolve any claims by the consumer that his IDE 350 informed him that he was a big winner when his ticket redeemed for a much smaller value (if any). To secure this audit trail it may be desirable to maintain a secure hash chain of all transactions. By maintaining all calculations at the Internet Game Server 351, the possibilities of the IDE 350 erroneously displaying an incorrect win or total are greatly minimized. Wording can also be added to the back 155 of the ticket of type 100, 105, 110 (FIG. 4) stating that a review of the audit file is the final arbitrator in all disputes.

As will be appreciated by anyone skilled in the art, the aforementioned is simply one embodiment of a multiplicity of possible variations. For example, as is previously discussed, this embodiment can also be funded with on-line tickets printed real-time at the time of purchase. Indeed this embodiment does result in a simpler system as shown in FIG. 7, albeit with modifications to the existing lottery central site 301 to accommodate generation of GACs tied to monetary values as well as less tangible advertising and the virtual currency metaphor inherent with the instant scratch-off Internet tickets of type 100, 105, and 110.

Figure 7:
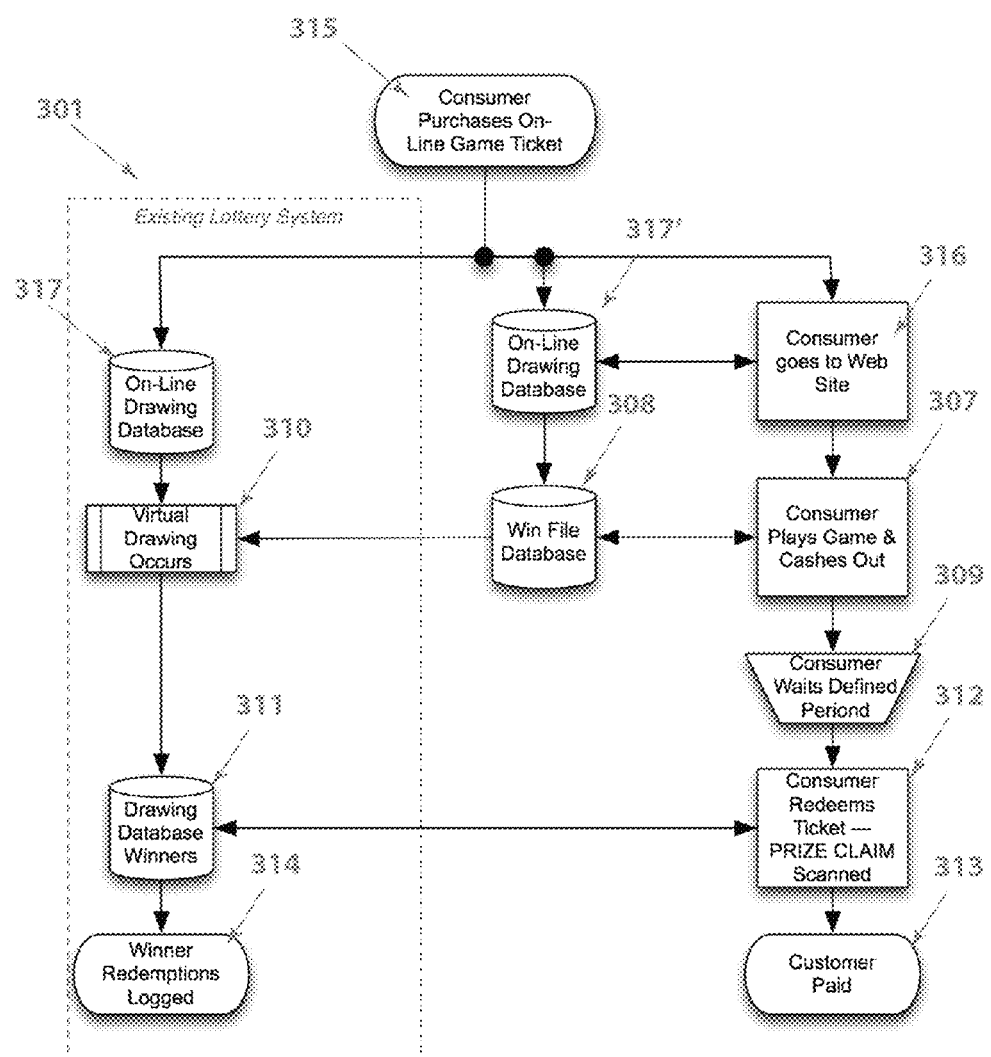
FIG. 7 is a flow chart of a second method of producing, distributing, and selling lottery-type tickets used to deposit funds for Internet gaming of FIG. 3.

FIG. 7 illustrates a second method of producing and selling lottery-type tickets used to deposit funds for Internet gaming of FIG. 3 type 200. In this case it is contemplated that the ticket funding the Internet game would be sold within an existing distribution on-line network already in place for drawing-based-games (e.g., Power Ball, Pick 3, Pick 4, etc.). Thus, in this embodiment the consumer would purchase a ticket from the retailer with the ticket and associated GAO and prize claim code (ticket serial number) printed real-time at the time of purchase 315. When the purchase is made, the existing lottery central site system 301 On-Line Drawing Database 317 would be updated with the purchased ticket serial number (prize claim code) awaiting a drawing. Also, as before, a related or identical copy of the same on-line database is also delivered 317' to the web server running the Internet game 200. Again, this copy of the database is used by the server to: determine the authenticity of received GAO, ensure that no GAO is credited twice, and to generate the correct prize claim codes for the tickets associated with winning games (i.e., where the consumer actuates the CASH OUT virtual button 203 with CREDITS 204 remaining) in the Win File database 308. As before, the consumer would then take the purchased ticket and go to the directed web site to enter the GAO printed on the ticket 316. (In this embodiment there is no need to hide the GAO because the on-line ticket is only printed after purchase.) The remainder of this second method embodiment is identical to the first embodiment and will not be repeated here for sake of brevity.

Figure 8:
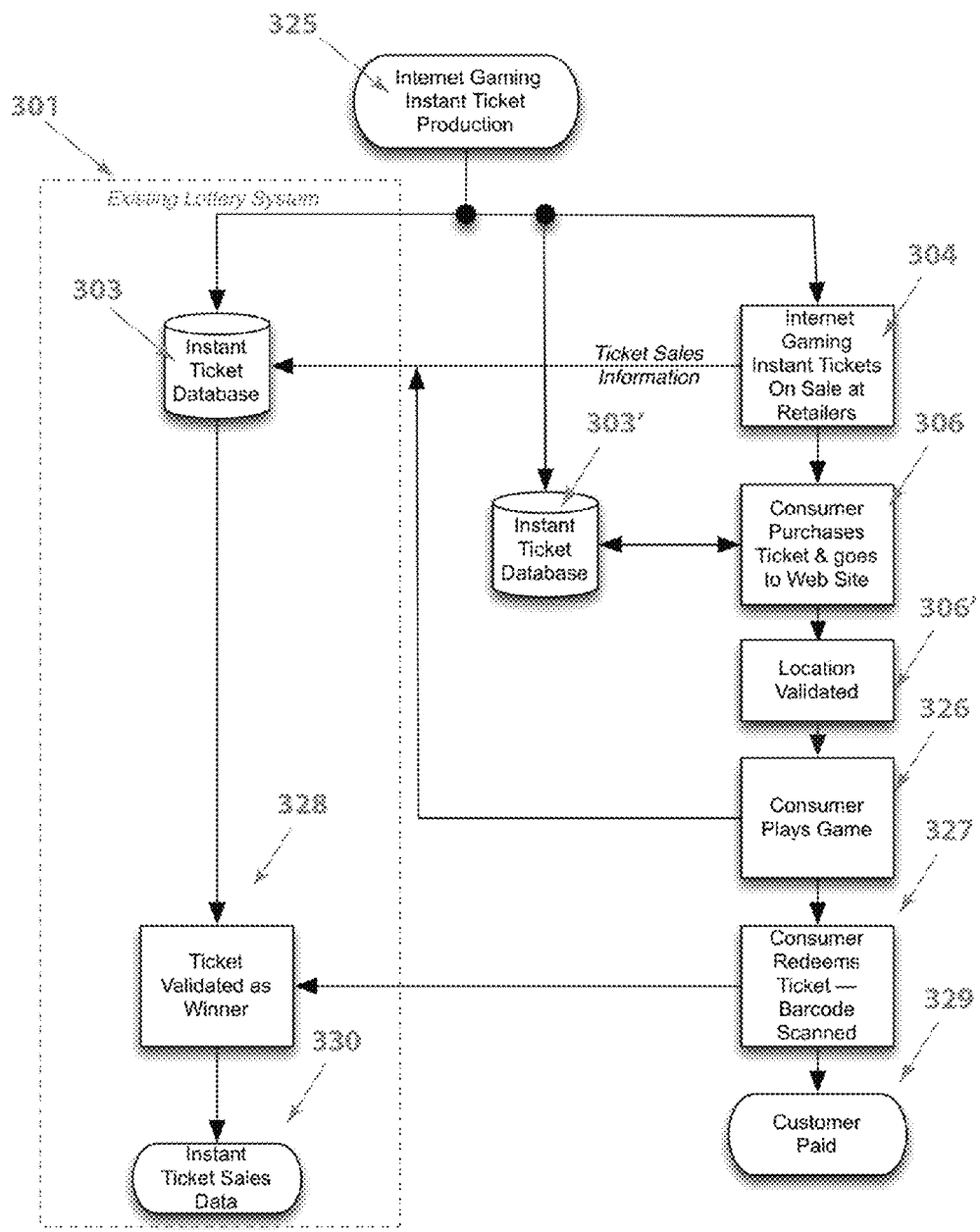
FIG. 8 is a flow chart of a third method of producing, distributing, and selling lottery-type tickets used to deposit funds for Internet gaming only in this embodiment, the outcome of the game is predetermined by the Game Activation Code (GAC); and, FIG. 9 is a representative example of many of the possible layers of a multi-tiered age and location identification and authentication algorithm.

Yet another possible embodiment, where the instant scratch-off Internet tickets of type 100, 105, and 110 result in a predetermined game outcome, is shown in FIG. 8. This embodiment has the advantage of a simpler system with virtually no modifications to the existing lottery central site 301. However, this embodiment has the disadvantage of deterministic outcome (i.e., no CASH OUT virtual button 203 or option) which, from a consumer's perspective, can create the perception of less control and consequently lower perceived chance of winning.

In this method, illustrated in the flow chart of FIG. 8, Internet tickets of type 100, 105, and 110 would be produced as before 325. However, in this embodiment there is no need for a separate PRIZE CLAIM code 150 on the back of the ticket (FIG. 4) or an associated On-Line Drawing Database of type 302 and 302' (FIG. 5). Rather, this embodiment only requires that a standard Instant Ticket Database 303 be maintained on the lottery central site system 301 as well as (optionally) a related or identical Instant Ticket Database 303' on the Internet game server.

Returning to the physical placement of tickets of the type 100, 105, 110 on sale at block 304, as before, the consumer purchases a ticket 306 and visits the specified Internet gaming site via web browser, specific application, or other means. When the consumer enters the GAO indicia data 135 by typing or other means into a GAME CODE entry window, the entered data is transferred to the server containing the Instant Ticket Database 303' where it is both authenticated and checked to ensure that the same GAO indicia data 135 has not been used before. If the GAO indicia data 135 is incorrect or has been used before, the appropriate error message will be returned to the consumer and game play will not be allowed. However, if the GAO indicia data 135 is authentic and unused, and the consumer's location is verified 306', the consumer will be allowed to play the Internet game 326. Again, in this embodiment, the outcome of the Internet game is predetermined by the ticket GAO indicia data 135 so the consumer will be required to play a specified number of rounds or complete a given number of tasks depending on how the Internet game is designed. When the game is concluded, the consumer can then take the ticket to the retailer who will scan the instant ticket barcode 327 to pass the data to the lottery's central site instant ticket validation system for payment authorization 328. If the ticket is authentic and the system returns a payment authorization, the consumer is paid 329 with the sales and redemption data both being recorded on the lottery's instant ticket database 330.

It should be noted, that an optional feature of this embodiment would allow for individual ticket activation when the consumer logs onto the web site and plays the game 326. This individual ticket activation would have the benefit of stopping a consumer from simply purchasing the ticket and asking the retailer if it was a winner without playing the game thereby ensuring that the consumer experienced the enhanced Internet gaming experience. This option would have the additional advantage that retailers would spend less time validating losing tickets. Individual ticket activation could be accommodated with existing lottery central site systems 301 by simply reducing the pack size to one ticket.

Figure 9:
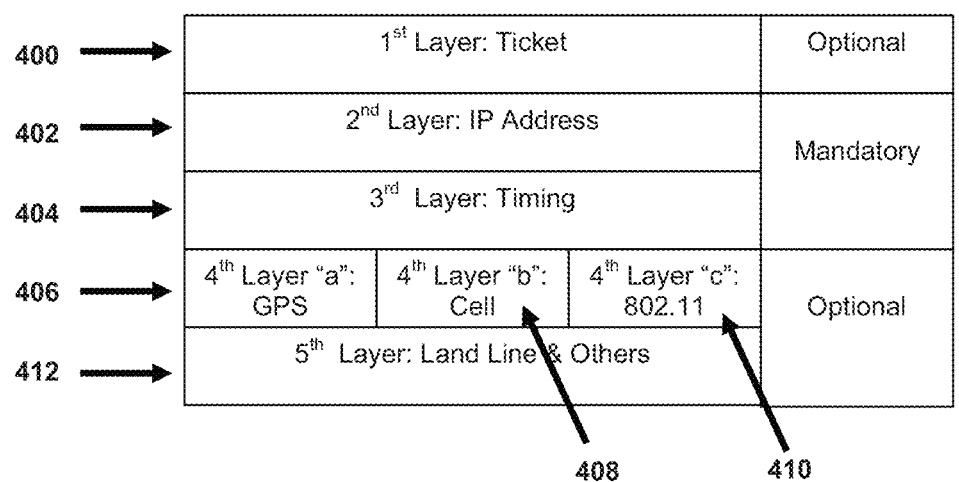

While the previously described embodiments explain mechanisms that provide various means for integrating Internet based games into a lottery's existing logistical sales and redemption structure, no mention of practical details for reliable Internet age and location identification and authentication has been described. Age and location identification and authentication are best served by layering two or more methodologies each having very low error rates. Layering allows the age/location system to be both flexible and effective, while minimizing the number of false rejects. For example, let's assume a location system only employs one layer, but that layer is 99.9% accurate. That is, if someone is attempting to use the system outside of the lottery's jurisdiction, there is a 1-in-1000 chance that the system will fail to detect and block the errant user. In other words the false accept and false reject failure rates are both 0.1%. Now, let's assume that only 1 in 10 million users of an Internet gaming site is attempting to play a game outside of the lottery's jurisdiction. Despite the high (99.9%) level of accuracy, because of the small percentage of users attempting to defraud the system, this hypothetical system will generate 10,000 false rejects for every real fraud attempt. This kind of usage-failure rate would make the hypothetical system impractical—i.e., by the time a real attempt to defraud the system occurs, legitimate users will have stopped using the system because it falsely blocked them too many times from playing a game. To prevent this problem, the lottery might be forced to greatly reduce the detection logic threshold criteria or turn off the logic completely. However, as shown in FIG. 9, with a layering architecture based on a foundation of low error rate methods, we can gradually build-up a reliable system that (for most practical purposes) ensures that the lottery's age and location identification and authentication requirements are met while virtually eliminating false rejects. However, as is obvious to anyone skilled in the art, the various layers described below are examples only and in some instances, one or more layer(s) can be deleted or changed while still maintaining the high level of age and location authentication. For example, in both the age and location authentication layering examples the first layer (i.e., purchasing a physical lottery ticket from a licensed retailer) may be eliminated in an attempt to increase sales by allowing purchases directly over the Internet.

The first level of age and location authentication can be imposed by the process of purchasing and redeeming a lottery ticket at an existing retail location 400. Indeed this, time honored methodology has been in place with modern lotteries for over three decades without any significant legal challenges. Thus, the purchase and redemption of tickets, as described in the previous embodiments, provides the same assurance that a consumer is of legal age and within a lottery's jurisdiction as in the past. However, since the new element "Internet game play" has been added, it may also be necessary to add requirements for age and location authentication that surpass or replace what has been previously accepted (since the consumer must now convince a computer that he is of legal age and in the jurisdiction). There are numerous embodiments that can add additional layers of authentication either by themselves or in conjunction with each other.

Figure 10:
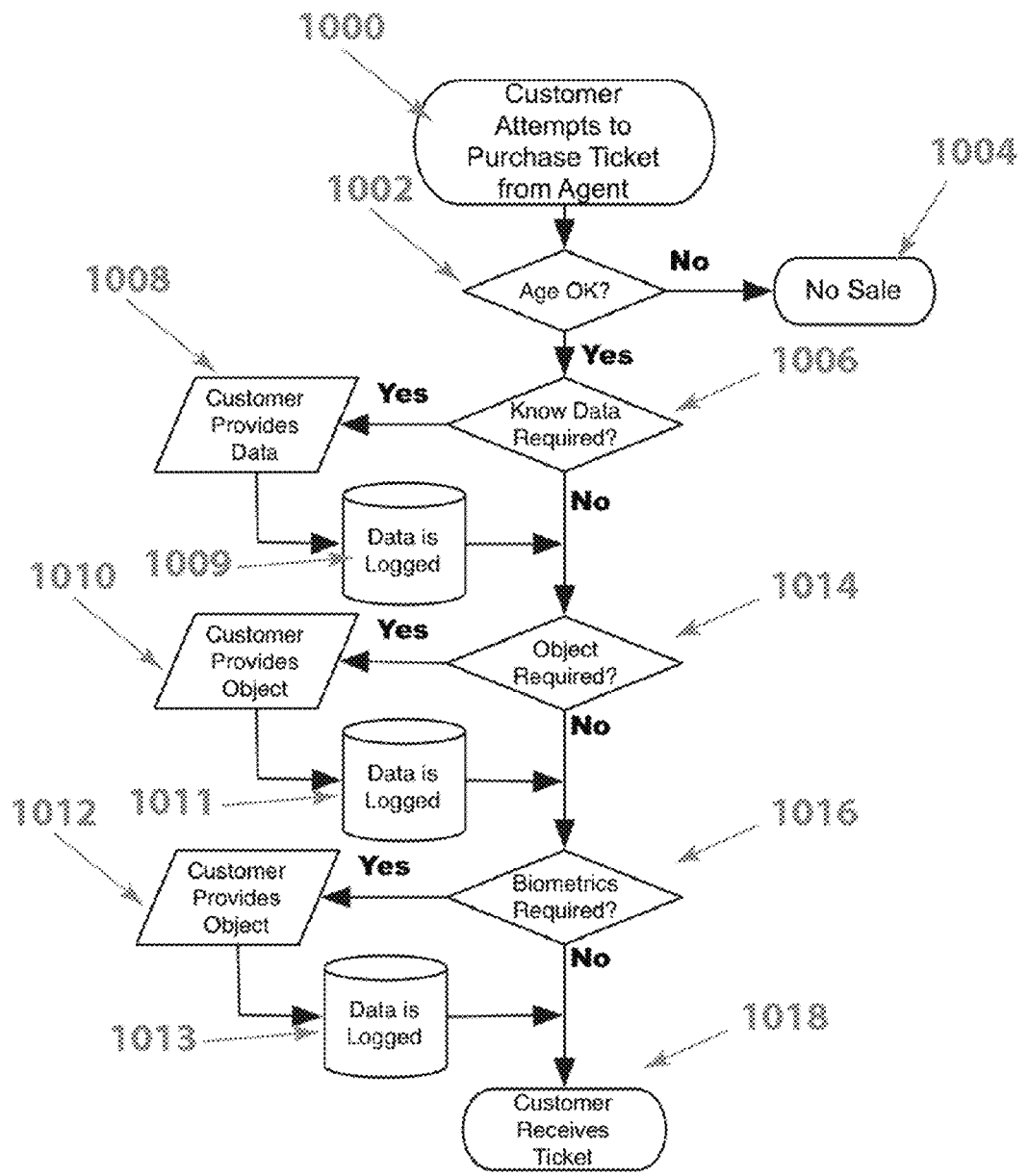
FIG. 10 is a flow chart illustrating several methods that may be used to authenticate a consumer's identity and, by inference, his age as indicated by FIG. 9.

Traditionally there are three ways to authenticate an individual and, by inference, his age: "by something he knows", "by something he has", and "by something he is" as collectively shown in FIG. 10. In other words, Internet age authentication is simply a subset of traditional identification and authentication of an individual and the three traditional methods of individual authentication are therefore also applicable to age authentication.

The first method employs the "something he knows" criteria. The most obvious "something" being passwords, PIN codes, lock combinations, etc. At the time of purchase 1000 of the Internet gaming ticket, the retailer could (assuming he is convinced that the consumer is of legal age 1002) ask the consumer to enter (for example) a Personal Identification Number (PIN) into a keypad or provide the retailer a password 1008. This PIN or password (i.e., "Known Data") could then be logged 1009 along with data of the ticket sold (e.g., scan of the ticket's barcode) to the consumer 1018. At this point, the consumer would be tied by "something he knows" to the ticket that enables Internet gaming. When the consumer attempts to play an Internet game, the system could simply prompt him for the PIN or password (Data) before allowing play to commence. With this level of authentication, the Internet gaming system would gain another layer of assurance that the consumer attempting to play the game is the consumer who purchased the ticket and is therefore of legal age. Also, it should be noted, that this level of "something he knows" authentication does not necessarily require the consumer to identify himself personally to the lottery system—i.e., the PIN or password is the only authentication data "known" to the lottery system. This additional layer of authentication incrementally reduces the possibility that an unauthorized youth below the legal age is attempting to play an Internet game.

The second method of traditional authentication is "something he has". The "something" might be a physical key, a membership card, a driver's license, or a mobile telephone card (an "Object" essentially a different form of "Data"). At the first level, the lottery ticket provides significant age authentication by the forced entry of the ticket GAO 135 and the "Known Data"—thereby authenticating that the ticket was purchased at an authorized lottery retailer and (presumably) with the consumer age verified by the retailer prior to purchase 1002. Of course, the "something he has"—i.e., "Object"—item can be added 1010 (e.g., a barcode identity card, scan of drivers' license barcode), but the basic principle remains the same. Like the "something he knows" method, anyone can give this "something he has" to anyone else—e.g., just as an instant lottery ticket can be passed from one person to another. Nevertheless, this second criteria serves to further reduce the likelihood of underage game play.

While the previous methods probably provide more than sufficient age authentication, yet another level of age authentication would be to adopt the method "something he is". More specifically, it is an example of "something that is a physical part of his body." Ostensibly, this "something" would be biometrics data 1016 including: voice-prints, fingerprints, hand geometry, facial geometry, handwritten signatures, iris and retina scans, etc. While some of these technologies may be a bit exotic and intrusive for the purposes of Internet gaming, it should be noted that technological advances might make some of the "something he is" age authentication far more practical as well as far more difficult to bypass. For example, microphones, fingerprint scanners, and cameras common in laptop computers may make face and voice biometrics practical for lottery authentication. Additionally, a signature long used by credit card companies as a second layer of "something he is" authentication (the first layer being "something he has"—i.e., the credit card), is relatively simple to collect and could be employed in the form of mouse movement or camera image for another layer of Internet gaming age authentication.

Like the sale of conventional scratch-off instant tickets, the purchase and redemption of tickets at an authorized lottery retailer does not necessarily ensure that the actual gaming experience occurred within the lottery's legal jurisdiction—e.g., a consumer could purchase a ticket within the lottery's jurisdiction, play the game outside the jurisdiction, and return to the jurisdiction to redeem winning tickets. This portability of play is a particularly vexing problem for Internet gaming. Federal law requires that all aspects of Internet gaming occur within the geographical jurisdiction of the hosting lottery including the actual game play. While this requirement can be met on the lottery support side by careful placement of the Internet servers and central site, the nature of the Internet itself, permitting action at a distance, makes it extremely difficult to ensure that the actual gaming experience occurs within a lottery jurisdiction.

Like age authentication, the first layer of location identification and authentication can be provided by the sale and redemption of the ticket 400 enabling play on the Internet. Since the ticket would only be sold in authorized lottery retail locations, which by definition are within the jurisdiction of the lottery, the sale and redemption of the ticket would ensure, at the very least, that these two transactions are conducted within the lottery's jurisdiction. Additionally, the sheer inconvenience of a consumer having to travel to the lottery's area of jurisdiction to purchase and redeem prizes would eliminate a large majority of casual users outside of the lottery's jurisdiction.

Since any device connected to the Internet must have an Internet Protocol (IP) address, a second layer of location identification and authentication could be provided by the IP address 402 of the device attempting to use a lottery Internet game web site. IP addresses 402 consist of four integers separated by periods (also called a 'dotted-quad') and look something like: 75.90.50.255. Since these numbers are usually assigned to Internet Service Providers (ISPs) within region-based blocks, an IP address can often be used to identify the region or general location from which a device is connecting to the Internet. If an IP address is known to be static, associated with a small entity or individual, and within a lottery's jurisdiction, it is a reasonable assumption that the game access request and associated activity will be taking place within a lottery's jurisdiction and could therefore be permitted access to the Internet game without the need for any more authentication.

Figure 11:
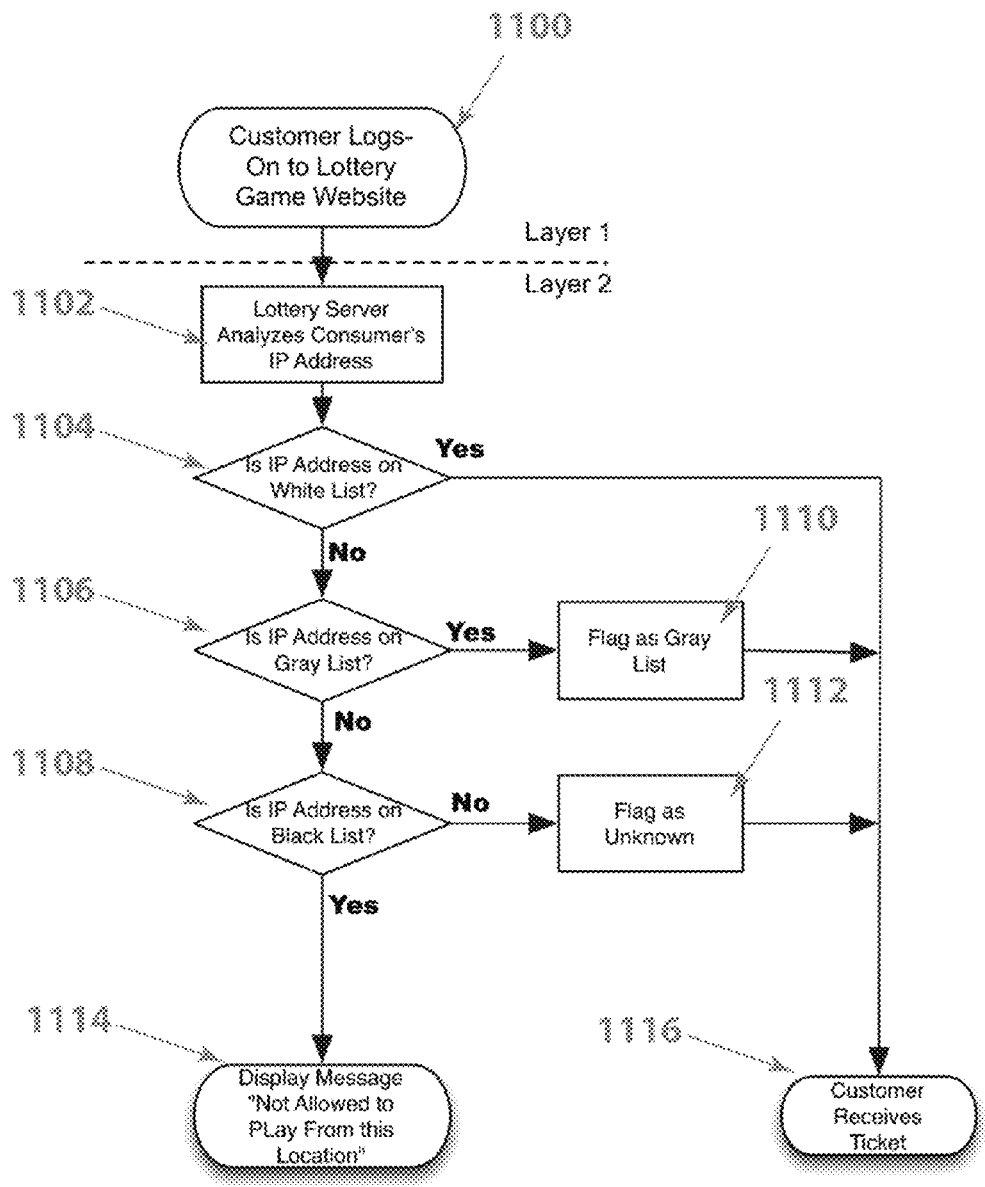
FIG. 11 is a flow chart illustrating a possible method of sorting and flagging IP addresses of Internet devices based upon listings maintained by the lottery or third parties and as indicated in FIG. 9.

However, because there are limited numbers of IP addresses, the ISPs typically issue IP addresses in a dynamic fashion out of a "pool" of IP addresses (Using DHCP or Dynamic Host Configuration Protocol). What this fact means is that instead of relying on a fixed IP address, an IDE will be assigned an IP address that is available from a subnet or "pool" that is assigned to the network. Though, if the pool of dynamically assigned IP addresses is known to be within a lottery's jurisdiction, the system could grant access with a reasonable level of confidence—though not as high a level of confidence as the static IP address method. Referring to FIG. 11, these known static and dynamic IP addresses can comprise a "white list" 1104 used by the lottery server as an important resource in verifying the consumer's IDE. The lower confidence level associated with dynamic IP addresses results from the possibility that a portable IDE (e.g., dial-up modem on a laptop computer, mobile smart telephone, satellite transceiver, etc.) could be assigned a dynamic IP while the portable device is outside a lottery's jurisdiction—i.e., it is much less likely that static IP addresses would be associated with portable devices.

The converse to known good IP addresses within a lottery's jurisdiction is known bad IP addresses both inside and outside of a lottery's jurisdiction. These IP addresses can be: geographically outside of a lottery's jurisdiction, proxy servers, known Tor server addresses, America On Line (AOL), etc. By maintaining a "black list" of IP addresses 1108, the system can immediately inform a potential user that his location is not within the lottery's legal jurisdiction and, due to federal law, he cannot play the lottery's Internet game from that location 1114.

There is, however, another category of IP addresses that could be granted access 1106 assuming other location identification and authentication is attained. These IP addresses would include such entities as: AOL, IP addresses on the border of the lottery's jurisdiction, etc. These types of IP addresses could be filed under a "gray list" designation 1110, where access might be permitted 1116 assuming a more rigorous location authentication and identification test has been successfully completed—e.g., 802.11 (Wi-Fi) authentication.

Finally, there is the possibility that the consumer is attempting to connect to the lottery's Internet game site from a previously unknown IP address 1112. In this event, the unknown IP address can be treated as a special case, where access may be permitted 1116 assuming a more rigorous location authentication and identification test has been successfully completed similar to the gray list.

Figure 12:
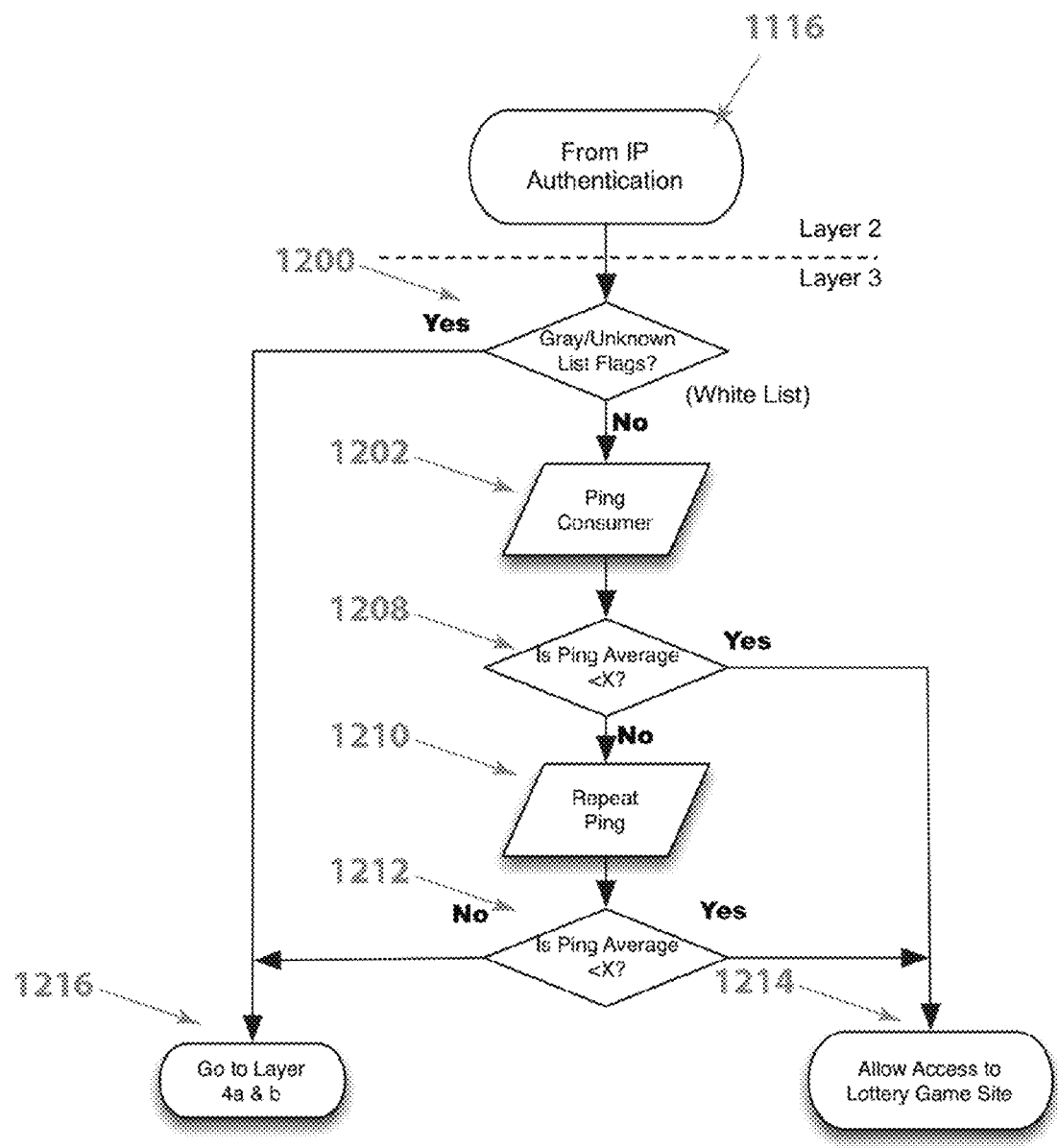
FIG. 12 is a flow chart illustrating a possible method of approving IP address locations based upon ping times as also indicated in FIG. 9.

Fortunately, portable devices (especially those using dial-up modems and satellite transceivers) and remote relays (e.g., Tor) can often be detected by simply sending a ping (i.e., series of data packets sent over the Internet to a specific device in order to generate a response from that device) to the suspected portable device 404 (Layer 3, FIG. 9). As shown in FIG. 12, if the IP address is a member of the white list 1200, a ping is sent to the consumer's IDE 1202. If the ping response time is less than a specified time period "X" (e.g., 50 ms) 1208 there is a reasonably high level of confidence that the device requesting access is not portable or relayed, and assuming the dynamic IP address is within a lottery's jurisdiction (white list), the location is valid and play should be permitted 1214. If the reply to the ping is greater than the prescribed time 1208, then additional pings 1210 can be sent to the requesting device to determine if the initial long ping reply was an anomaly (e.g., a server was busy at the time of the first ping) or normal for this connection. If the additional pings continue to produce a response time in excess of "X" ms 1212, the device requesting Internet play is most probably portable or a relay and additional location authentication may be desired 1216. This additional pinging is practical because a series of pings can occur within one or two seconds and require no action by a human being, making repeated attempts at ping-based location authentication less intrusive to the gaming process than techniques that require human intervention.

If the IP address is a member of the Gray or Unknown list 1200, game play might be allowed if additional authentication is obtained 1216.

Figure 13:
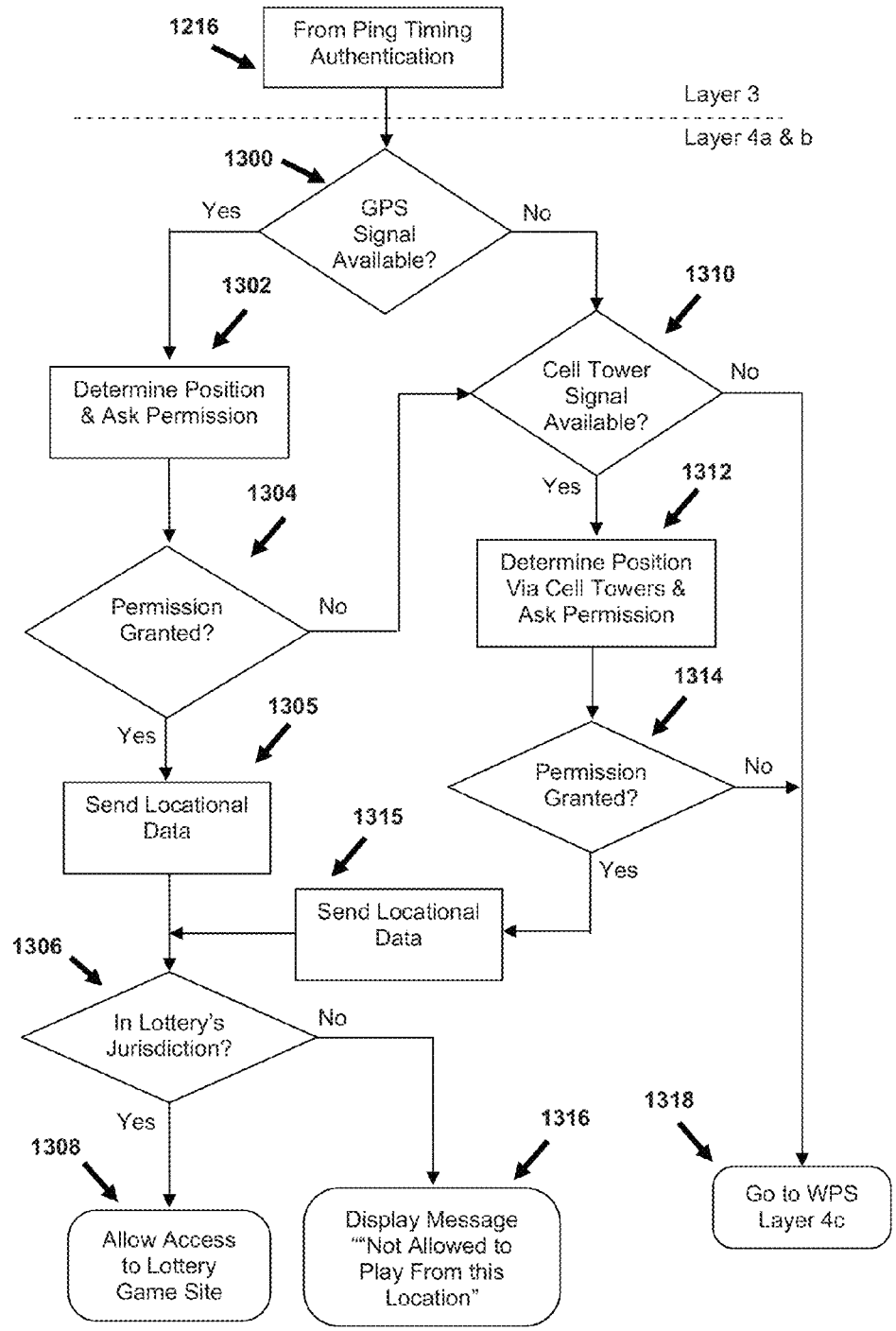
FIG. 13 is a flow chart illustrating possible methods of geolocating Internet devices based upon signals available from GPS and/or Cell tower signals as also indicated by FIG. 9.

There may be circumstances in which additional authentication is necessary or the consumer is connecting with the lottery's Internet site by a smart mobile telephone, laptop computer, or other IDE that is equipped with some version of Radio Frequency (RF) receiver—e.g., Global Positioning System (GPS), Cell phone, or WiFi receiver 406 in FIG. 9. In some cases, depending upon the model of smart phone, provider network, and service plan, GPS data may be available. The GPS can determine the location of the telephone or other IDE and then, with the consumer's permission, transmit that information, or other activation information, to the lottery's Internet site. Once the location data is received, the Internet site will determine if the game play will be within its legal boundaries and allow (or forbid) game play. It should be noted, that GPS provides accurate location authentication (i.e., 10-meter resolution) in "open sky" environments, like rural areas or highways. In urban areas and indoors, tall buildings and ceilings block GPS receiver's reception, resulting in serious performance deficiencies in time-to-first-fix, accuracy, and availability. In such situations A-GPS (Assisted-GPS), where terrestrial GPS broadcasts are used to supplement the GPS signal, can still be utilized by GPS equipped Internet devices to give location authentication in most cases, albeit with a slight degradation in accuracy but not significant enough to interfere with lottery location requirements. As shown in FIG. 13, if the location authentication process is handed off to Layer 4a & b, 1216, and a GPS signal is available 1300, and the consumer's device, network, and service plans are compatible, then in one embodiment, the IDE will determine its position and ask permission to send the data to the lottery's web site 1302. Assuming permission is granted 1304, the data is sent to the lottery computer 1305 which then determines if the consumer is located within the lottery's jurisdiction 1306 and permits 1308 or denies 1316 access to the gaming website. If permission is not granted 1304—e.g., for security or personal reasons—the consumer can be given the option to send a Location Verification Code (LVC) instead. This LVC could be designed to not contain specific information about the consumer's location except that he was within the lottery's jurisdiction. Of course, in such case, the IDE would make the decision that it was located within the lottery's jurisdiction using a dedicated software algorithm that would be made available for download. If the consumer also chooses to deny permission to send an LVC, the location application can check for a cell tower signal 1310.

There are cases where a GPS signal is simply not available or no GPS receiver is present on the mobile system or the consumer has refused to grant permission for the more accurate GPS data or LVC to be passed to the lottery. In these cases, cell tower triangulation may be utilized to provide generalized location results with an accuracy of approximately 200 to 1,000 meters. This accuracy, for all but state border situations, would provide sufficient resolution for lottery location authentication purposes. Various service providers maintain a worldwide database of cell tower locations. This database can be licensed for a modest fee, allowing the lottery's application on a mobile telephone to utilize the cell towers that it is detecting to determine if the consumer is within the lottery's legal boundaries. Note that mobile telephones can detect the Cell ID from towers at a far greater distance than they can connect to the tower for communications. As shown in FIG. 13, the procedure is similar to GPS location. If there is no GPS signal 1300, or the consumer has refused permission to pass GPS data to the lottery 1304 but a Cell phone signal is available 1310, the system may be able to geo-locate by triangulation or other means. If the IDE is localized, permission is requested to send the data to the lottery's website 1312. If permission is granted at 1314, locational data is sent to the lottery at 1315 and the lottery's computer verifies the consumer is within its jurisdiction 1306 and permits 1308 or denies access to the game 1316. If the consumer denies permission to send detailed locational information 1314 (e.g., perhaps for security or personal reasons), he can, as before, be given the option to send an LVC instead. If the consumer also chooses to deny permission to send an LVC, the location application can hand off to the WiFi Positioning System (WPS) layer 4c, 1318. If cell signals are not available 1310, the process could also be handed off to the WPS 1318 application.

Figure 13A:
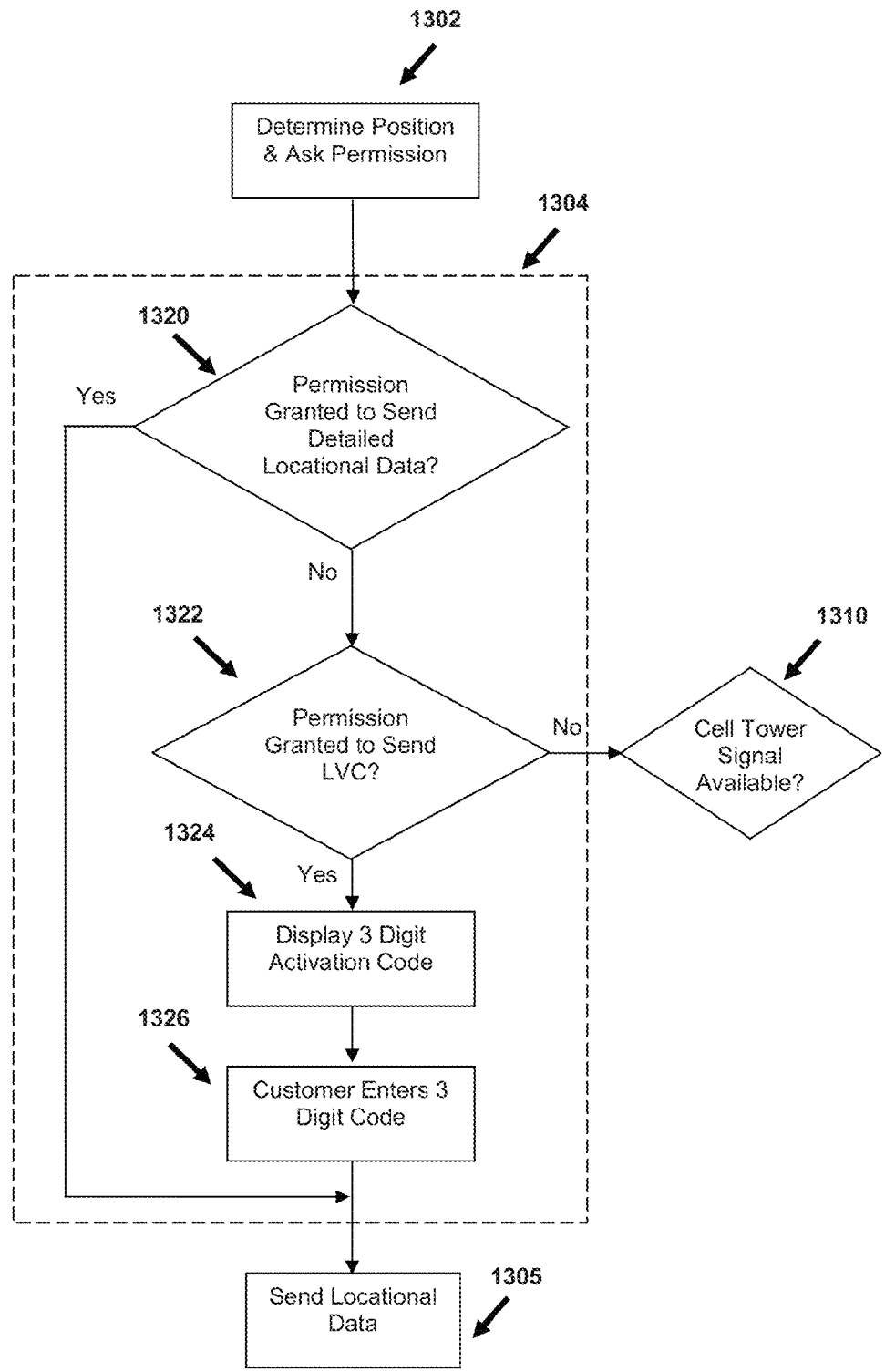
FIG. 13A is a flow chart illustrating in more detail certain functions of the flow chart of FIG. 13.

The permission to send LVC information can be handled in a manner similar to that shown in FIG. 13A. The decision block 1304 is expanded to show that if the consumer denies permission to send detailed locational information 1320— e.g., GPS co-ordinates or street, number, city, and state— then he is given the option to send, for example, a 3 digit LVC 1322. It is clear that three digits cannot precisely locate the consumer and, as a result, may be an acceptable alternative and allay his privacy concerns. If the LVC contains too many digits, the consumer may think his actual location is embedded. If the consumer accepts the LVC option 1322, the dedicated software application determines (from GPS, Cell, or WPS data) if the IDE is within the lottery's jurisdiction and creates the LVC based upon instructions from the lottery server—e.g., "578"=within jurisdiction any other number=outside jurisdiction. Of course this LVC changes on a regular basis perhaps as a function of time, date, SID, a combination of these data or other criteria. The LVC is displayed to the consumer at 1324. The consumer enters the LVC via the keypad or other means at 1326 and the data is sent to the lottery 1305. If the consumer refuses permission to send the LVC 1322, then the decision is handed off to the Cell Tower decision block at 1310 (as before). Of course this same procedure can also be used in place of the Cell Permission Granted block 1314 in which case, if the consumer refuses permission to send the LVC, the application would hand off to the WPS layer 1318.

Figure 14:
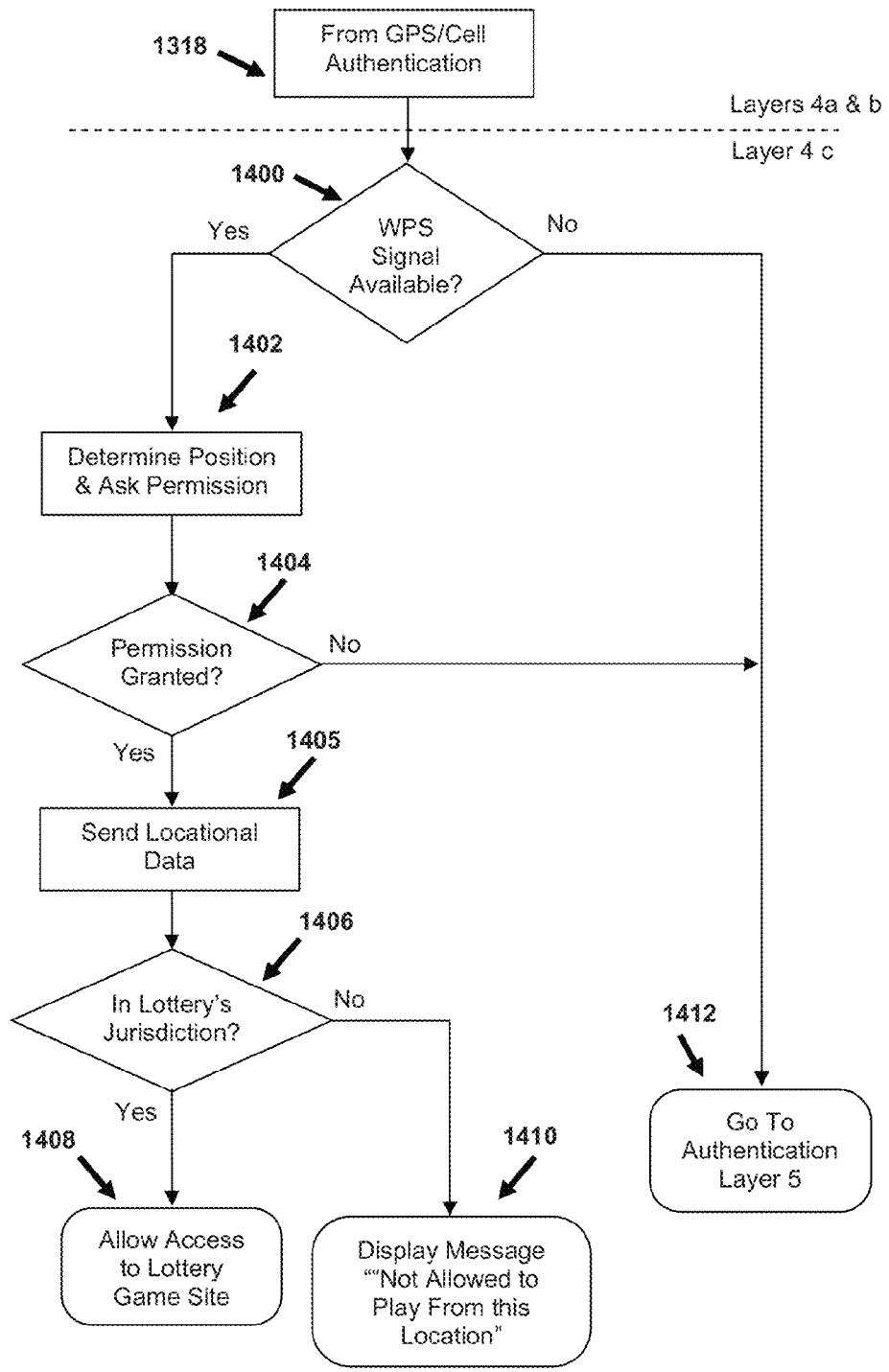
FIG. 14 is a flow chart illustrating a possible method of geolocating Internet devices based upon a WiFi Positioning System as also indicated by FIG. 9.
Figure 15:
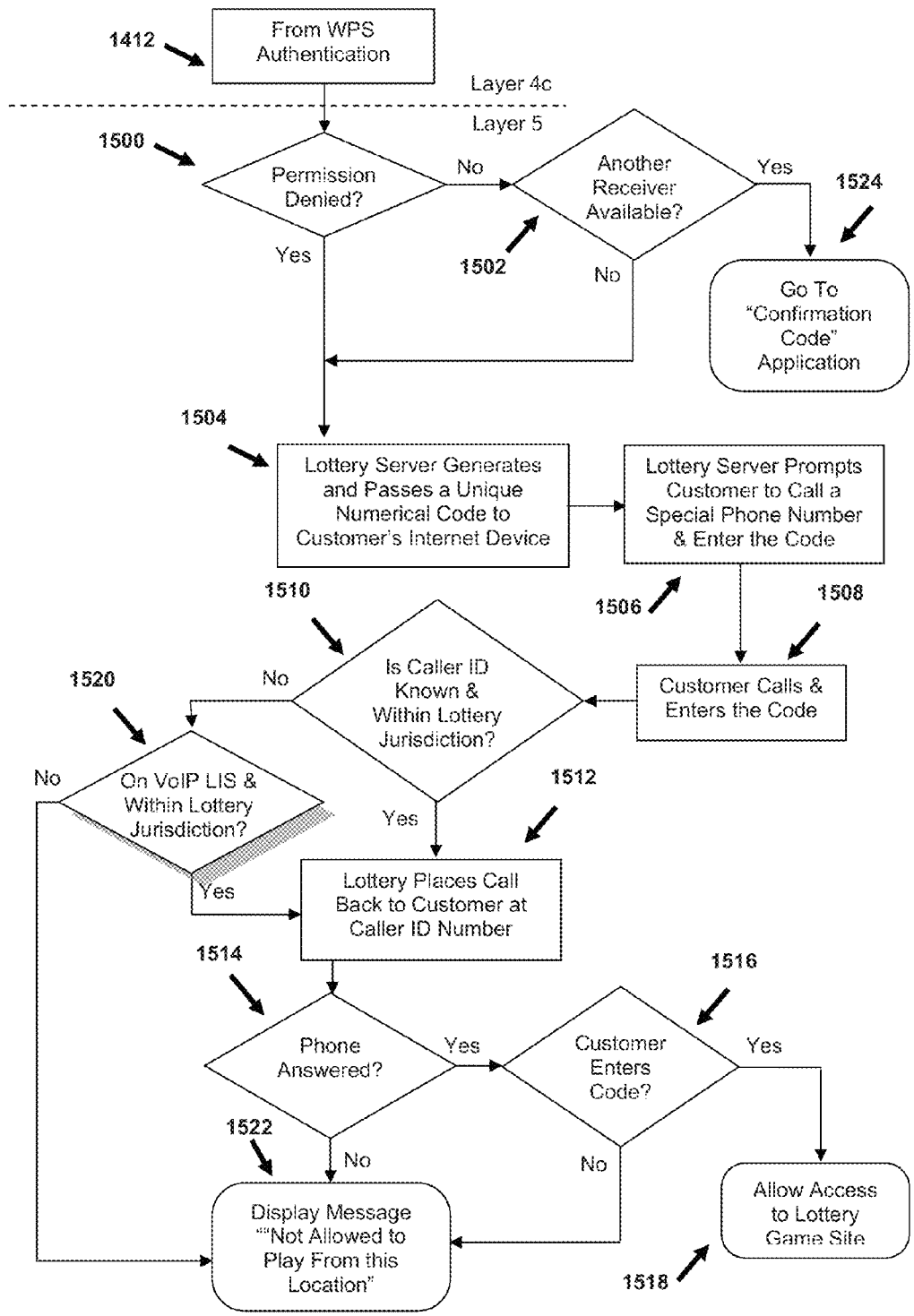
FIG. 15 is a flow chart illustrating a possible method of geolocating Internet devices based upon a landline, Voice Over IP (VoIP), or Cell telephone system as also indicated by FIG. 9.

Most personal computers are not equipped with data modems and therefore, cell tower triangulation is not an option for location authentication with these devices. Fortunately, there is a proven system for location authentication that uses the 802.11 (Wi-Fi) transceiver built into virtually every personal computer and other Internet devices on the market today. WPS can determine location based on databases of known Wi-Fi access points by using the Media Access Control (MAC) addresses of nearby 802.11 wireless access points. MAC addresses are a unique identifier assigned to most network adapters by the manufacturer for identification purposes. WPS typically performs best where GPS is weakest,—e.g., in urban areas and indoors—providing service similar to GPS without GPS hardware or signals. Even when consumer platforms are equipped with GPS receivers, WPS can be used to provide complementary services when GPS is not available or the consumer refuses permission to use GPS data. The accuracy of WPS is reported to be 20 to 30 meters, with near 100% coverage in urban areas. Like Cell ID, MAC address Wi-Fi signals can be detected for WPS at a far greater distance than they can be used for communications. Various service providers maintain a worldwide database of Wi-Fi "access points". This database can be licensed for a modest fee, allowing the lottery's application on a mobile telephone or other IDE to utilize these access points to determine if the consumer is within the lottery's legal boundaries. As shown in FIG. 14, if a WPS signal is available 1400, a software application can determine the consumer's location and ask permission to send the information to the lottery's web site 1402. If permission is granted 1404, locational data (or LVC) is sent to the lottery's server 1405. The lottery's application can determine if the consumer is located within the jurisdiction 1406 and allow 1408 or prohibit 1410 game play. As in the case of GPS and Cell ID, if the consumer does not want to send detailed locational information at 1404, he can be given the opportunity to send an LVC instead. If WPS signals are not available or the consumer refuses permission 1404, the location procedure can be handed off to a fifth layer of authentication 1412.

Returning to the problem of providing location authentication under questionable cases (e.g., long ping on a dynamic IP address 1212, grey or unknown lists 1200, consumer refuses permission 1404, other options not available, etc.), as shown at 412 in FIG. 9, a fifth layer of verification still remains. Assume the lottery's server encountered one or more "permission denied" messages anywhere in the previous process—e.g., at 1304, 1314, 1322, 1404, or others. That means the consumer's IDE has access to at least one RF receiver-based source of locational data but the consumer chose to deny its use. Then at 1500, because permission was previously denied, there still remains a "land line" option for location verification. The lottery server could automatically generate a unique numerical code and send it to the consumer's IDE 1504 along with a prompt requesting that the consumer dial a toll free number from a landline-based telephone and then key in the numerical code 1506. The consumer would then call the phone number and identify himself with the aforementioned unique code 1508. The lottery computer would perform a reverse lookup on the Caller ID (CID) number to obtain location information 1510. As in the case of cell towers and Wi-Fi access points, various service providers maintain a worldwide database of land line telephone numbers and addresses. This database can be licensed for a modest fee, allowing the lottery's application to determine if the consumer is within the lottery's legal boundaries. If the number is determined to be within the lottery's jurisdiction 1510, there still remains the problem of a "spoofed" CID. The lottery will place a call-back to the CID number 1512 and if the call is not answered, the server will deny game play 1522. If the call is answered and if the consumer enters the (correct) code at 1516, game play is permitted. If no code or an incorrect code is entered 1516, game play is denied 1522. Numbers that cannot be identified (unknown) 1510 are typically cell phone numbers or Voice over Internet Protocol (VoIP) numbers and in some cases could be compared to data contained within a VoIP Location Information Server (LIS) database 1520. If the VoIP or Cell number can be identified, it will cause a call back 1512 to prevent spoofing. Again, assuming the consumer answers the call 1514 and enters the numeric code 1516, game play could be permitted 1518. If the VoIP or Cell number cannot be confirmed 1520 or the consumer does not answer 1514 or an incorrect code is entered 1516 access to the game could be denied 1522.

For those cases in which the consumer has not denied permission to forward RF receiver data—e.g., GPS, cell tower, or WPS data 1500 it may be that his game play IDE does not have access to RF receiver data. However, an alternate IDE may be available—e.g., the consumer may have a smart phone but does not wish to play the game on the small screen display—1502. In this case, a further level 5 option, the "Confirmation Code" option may be used 1524. If another RF receiver is not available 1502, a land-line option 1504 may be used.

Figure 16:
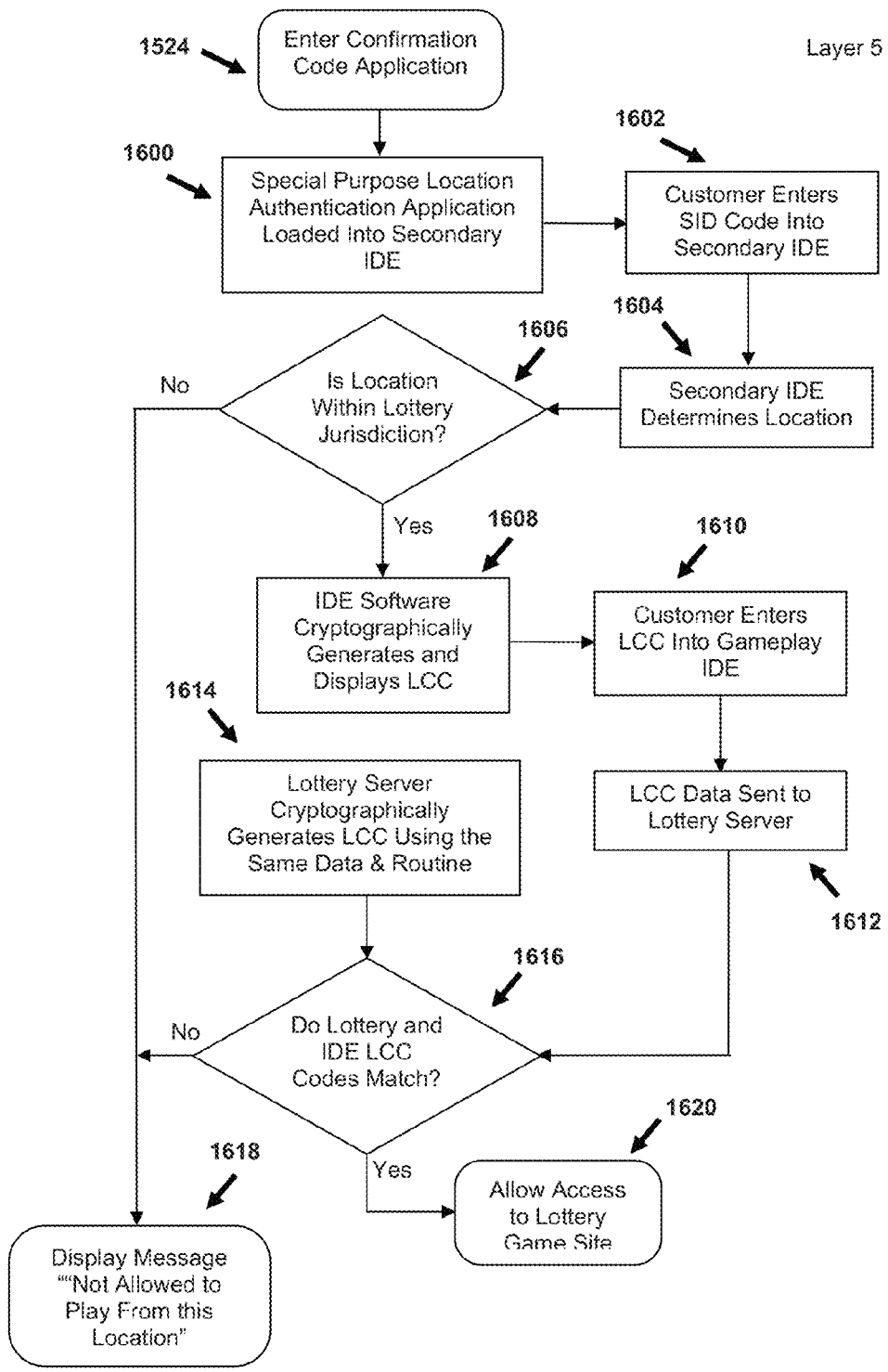
FIG. 16 is a flow chart illustrating a possible method of geolocating one Internet device based upon a Confirmation Code generated by a second Internet device without sending precise locational information as also indicated by FIG. 9.

As shown in FIG. 16, the lottery could offer a special purpose software application 1600 for a smart telephone or other IDE that would utilize the previously described location identification mechanism (e.g., GPS, cell tower triangulation, 802.11 triangulation, etc.) to locally authenticate that the IDE is in the lottery's jurisdiction. In one embodiment, the consumer would enter the SID code from the lottery's website (which could be provided upon acceptance of the GAC and would be displayed on the gameplay IDE) into the "secondary" IDE—i.e., the device being used for geolocation. The secondary IDE would then attempt to determine its location. Upon successful—i.e., in jurisdiction—location verification 1606, the software would cryptographically create and display a Location Confirmation Code (LCC) 1608 on, for example, a pop-up window. The LCC could then be keyed-in to the gameplay IDE by the consumer 1610 when he is attempting to prove location to the lottery's Internet game web site. The lottery's server could create an LCC using the same input data and software routine 1614 that could be compared against the consumer's version 1616. Ideally the LCC would be a short cryptographic code (e.g., keyed hash of current time, valid location, and SID) that would be accepted by the lottery's web site for some reasonable time after it was generated (say five minutes) and allow gaming to proceed without further interaction. Obviously, the LCC would be created using a method that was sufficiently hardened to avoid hacking of codes. If the two codes match 1616, then game play can be allowed 1620 or prohibited 1618. If the secondary IDE is found to be outside the lottery's jurisdiction 1606, then game play would be denied 1618. In the example described, the consumer does not divulge his actual location to the lottery. However other embodiments might send more precise information or longer LCCs depending upon specific requirements of the particular application.

Previous sections of this application have described geolocation for consumer Internet Devices that are involved in the playing of an Internet-based lottery type game. However, as will be appreciated by those skilled in the art, the same techniques may be useful for a variety of other purposes—e.g., to permit the online purchase and/or redemption of lottery tickets, geolocation of lottery terminals, geolocation of lottery ticket validation equipment, and other on-line commerce or logistics purposes.

Although preferred embodiments of the invention have been disclosed in the foregoing specification, it will be understood by those skilled in the art using the teachings disclosed herein that many modifications and other embodiments are within the scope of the present invention.

What is claimed is:

1. A server-implemented method for verifying age or geographic location of a player of an Internet-based lottery game, the method comprising:

providing, via a terminal, lottery tickets for purchase by a player at an authorized retail location, the lottery tickets having a game authorization code;

receiving, via an Internet enabled device (IDE), the game authorization code from the player so as to initiate play of the Internet-based lottery game;

the terminal of the authorized retail location in communication with a lottery system central computer that is in further communication with an Internet game server for implementing the Internet-based lottery game via a web site;

verifying the age of the player at the authorized retail location and, for verified players, generating a separate verification password via the terminal of the lottery system central computer, the verification password linked to the game authorization code;

after verifying the age of the player at the authorized retail location and generating the separate verification password, providing, via the terminal of the lottery system central computer, the verification password to the player; and upon initiating play of the Internet-based lottery game, requiring the player to enter the verification password separately from the game authorization code, wherein the Internet game server communicates with the lottery system central computer to ensure that the entered verification password corresponds to the linked verification password prior to permitting the player to proceed with play of the Internet-based lottery game.

2. The method as in claim 1, wherein the verification password is a personal identification number (PIN) entered by the player at the terminal.

3. The method of claim 1, wherein the geographic location corresponds to a lottery authority's jurisdictional area.

4. The method of claim 1, further comprising providing software from the lottery authority to the IDE to implement generation of the verification password.

5. The method of claim 1, further comprising displaying the verification password to the player prior to commencement of the game.

6. The method of claim 1, further comprising receiving the verification password from the player via the IDE prior to commencement of the game.

7. The method of claim 1, wherein the IDE includes a WiFi receiver, wherein the geographic location of the IDE is determined by an embedded software application as a function of known media access control (MAC) addresses of WiFi access points accessed by the IDE, wherein the software application also generates the verification password in the event that the player refuses permission to transmit the geographic location of the IDE as determined by the WiFi access points.

8. The method of claim 1, wherein the IDE is equipped with multiple wireless location data transmission capabilities, the method further comprising establishing a hierarchy of the wireless location data transmission capabilities, wherein a second one of the location data transmission capabilities in the hierarchy is attempted only if a first one of the location data transmission capabilities is unable to determine the geographic location of the IDE or the player has refused permission to transmit the verification password associated with the first one of the location data transmission capabilities.

9. The method of claim 8, wherein the IDE is a mobile cellular device and the player refuses permission to transmit the verification password associated with all wireless location data transmission capabilities, the method further comprising providing the player with a different code via the IDE and a prompt instructing the player to place an initial call to a given telephone number via a land line telephone and enter the different code, wherein a location of the land line telephone is determined via a caller ID system to verify that the player is within the given geographic area for play of the lottery game.

10. The method of claim 9, wherein a call is placed back to a caller ID number generated by the player's initial call, and the player is prompted to enter the different code before play of the lottery game can be initiated.

11. The method of claim 1, wherein upon verification that the IDE is within the given geographic area, a confirmation code is generated and transmitted to the player's IDE and stored at the lottery system central computer, the player being given the option to enter the confirmation code in a different gameplay IDE for actual play of the lottery game, wherein the confirmation code entered by the player is then compared to the confirmation code stored at the lottery system central computer prior to access being granted to play the lottery game via the different gameplay IDE.

* * * * *